US012746933B2

(12) United States Patent
Yoganathan et al.

(10) Patent No.: US 12,746,933 B2
(45) Date of Patent: Sep. 29, 2026

(54) SYSTEMS AND METHODS FOR TRACKING HISTORIC DRIVER DATA ON THE EDGE

(71) Applicant: Moter Technologies, Inc., Torrance, CA (US)

(72) Inventors: Sivashankar Yoganathan, Moorpark, CA (US); Patrick Heffernan, Moorpark, CA (US); Pranam Kalla, Simi Valley, CA (US); James Makishima, Palos Verdes, CA (US); Kenji Fujii, Torrance, CA (US); Craig Lozofsky, Torrance, CA (US); Erika Shimojo, Torrance, CA (US); Taku Yamane, Torrance, CA (US)

(73) Assignee: MOTER TECHNOLOGIES, INC., Torrance, CA (US)

( * ) Notice: Subject to any disclaimer, the term of this patent is extended or adjusted under 35 U.S.C. 154(b) by 135 days.

(21) Appl. No.: 18/783,203

(22) Filed: Jul. 24, 2024

(65) Prior Publication Data

US 2025/0033649 A1 Jan. 30, 2025

Related U.S. Application Data

(60) Provisional application No. 63/515,272, filed on Jul. 24, 2023.

(51) Int. Cl.
*B60W 40/09* (2012.01)
*G06Q 40/08* (2012.01)
(Continued)

(52) U.S. Cl.
CPC ............. *B60W 40/09* (2013.01); *G06Q 40/08* (2013.01); *G06V 20/59* (2022.01); *G06V 20/597* (2022.01);
(Continued)

(58) Field of Classification Search
CPC ............. B60W 40/09; B60W 2520/10; B60W 2556/10; G06Q 40/08; G06Q 50/43;
(Continued)

(56) References Cited

U.S. PATENT DOCUMENTS 8,140,358 B1 3/2012 Ling et al.
9,180,887 B2 11/2015 Nemat-Nasser et al.
(Continued)

FOREIGN PATENT DOCUMENTS

CN 111091474 A 5/2020
CN 112776738 A 5/2021
CN 113705333 A 11/2021

OTHER PUBLICATIONS

Related) PCT/US2024/039397. International Search Report & Written Opinion (Nov. 28, 2024).
(Continued)

*Primary Examiner* — Sm A Rahman
(74) *Attorney, Agent, or Firm* — Heidi Eisenhut; LOZA & LOZA, LLP

(57) ABSTRACT

Driver insurance and risk management scores are calculated per driver based on vehicle and driver behavior data collected during driving sessions. Often one vehicle is shared by multiple drivers and one driver can drive multiple vehicles. The present disclosure securely tracks the individual drivers, stores, and retrieves associated driver data for analysis on the edge (vehicle) in near real time. Data collected is analyzed at various time intervals (each trip, daily, monthly) to produce the scores. The goal of the proposed solution minimizes cost associated with data transmission and cloud storage, tracks long term driver driving history on the edge for near real time analysis of driver behavior, minimizes driver distraction due to user device while driving, securely stores and retrieves driver driving data on the edge device associated with the driver, restricts
(Continued)

access to the driver driving data, and restricts user device access to servers and telematic units.

19 Claims, 29 Drawing Sheets

(51) Int. Cl.
*G06V 20/59* (2022.01)
*G06V 40/16* (2022.01)
*H04L 9/06* (2006.01)
*H04L 67/12* (2022.01)
*H04W 4/40* (2018.01)

(52) U.S. Cl.
CPC .......... *G06V 40/172* (2022.01); *H04L 9/0643* (2013.01); *H04L 67/12* (2013.01); *H04W 4/40* (2018.02); *B60W 2520/10* (2013.01); *B60W 2556/10* (2020.02)

(58) Field of Classification Search
CPC .... G06V 20/59; G06V 20/597; G06V 40/172; H04L 9/0643; H04L 67/12; H04L 2209/84; H04L 9/3236; H04L 63/0428; H04L 63/0435; H04L 67/1095; H04L 67/535; H04W 4/40; H04W 4/029; H04W 4/80; H04W 12/06
See application file for complete search history.

(56) References Cited

U.S. PATENT DOCUMENTS

| | | | |
|---|---|---|---|
| 9,221,428 | B2 | 12/2015 | Kote et al. |
| 10,127,810 | B2 | 11/2018 | Durie, Jr. et al. |
| 11,273,838 | B2 | 3/2022 | Du et al. |
| 11,299,127 | B2 | 4/2022 | Tucker et al. |
| 11,321,970 | B2 | 5/2022 | Wright |
| 11,578,990 | B1 | 2/2023 | Chintakindi et al. |
| 11,580,756 | B2 | 2/2023 | Gleeson-May et al. |
| 2012/0101855 | A1 | 4/2012 | Collins et al. |
| 2016/0105539 | A1 | 4/2016 | Maddox et al. |
| 2016/0360557 | A1* | 12/2016 | Lavi ........................ H04L 69/14 |
| 2020/0050774 | A1 | 2/2020 | Unagami |
| 2020/0068371 | A1* | 2/2020 | Lowe .................. H04M 1/6091 |
| 2022/0032920 | A1 | 2/2022 | Varughese et al. |
| 2022/0048432 | A1 | 2/2022 | Switalski et al. |
| 2022/0237277 | A1 | 7/2022 | Rahman et al. |
| 2022/0412759 | A1* | 12/2022 | Neubecker ........... G01C 21/365 |

OTHER PUBLICATIONS

Related) PCT/US2024/039393. International Search Report & Written Opinion (Oct. 31, 2024).
LUNDBAEK. The Porsche-XAIN Vehicle Blockchain Network: A Technical Overview (Mar. 23, 2018).
Corresponding PCT Application No. PCT/US2024/039379. International Search Report & Written Opinion (Oct. 29, 2024).

* cited by examiner

SYSTEMS AND METHODS FOR TRACKING HISTORIC DRIVER DATA ON THE EDGE

CLAIM OF PRIORITY

The present Application for Patent claims priority to U.S. Provisional Application No. 63/515,272 entitled "Systems and Methods for Tracking Historical Driver Data on the Edge", filed Jul. 24, 2023, which is hereby expressly incorporated by reference.

TECHNICAL FIELD

The present disclosure generally relates to systems, apparatuses, and methods for tracking historic driver data on vehicles.

BACKGROUND

Currently, fleet companies rely on complicated processes with duplicated systems and paperwork that is heavily reliant on human beings for associating drivers of fleet vehicles with specific vehicles. The "fleet use-case" uses out-of-band communications to associate a driver to a vehicle using cloud infrastructure (back-end systems). The fleet companies manually update their back-end system to reflect the driver to the vehicle association. The telematic devices on the edge send vehicle and driver data regularly to the back-end system during the driving sessions. The back-end system then uses the received data and the out-of-band driver-vehicle association mapping to calculate the driver scores. The "personal-line use-case" may try to use driver's smartphone to identify the driver, however when there is more than one driver of the vehicle present in the vehicle such a system fails to correctly identify the actual driver among the drivers of the vehicle. Since the driver identification requires out-of-band communication, the vehicle and driver data are stored in the cloud for analysis.

The process described above requires a lot of manual processing and review. In view of the above, what is needed are automated systems and methods for tracking historic driver data on vehicles reducing manual processing and review.

SUMMARY

The following presents a simplified summary of one or more implementations in order to provide a basic understanding of some implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

According to one example, one or more non-transitory computer readable media storing computer-executable instructions that upon execution cause one or more processors on a user device to perform acts is provided. The user device is caused to perform securing the user device to a docking station on a telematic unit for communicating with a server; transmitting, via the one or more processors, user device identifier data to the server for validating the user device; receiving, via the one or more processors, a user device authentication identification from the server upon successful validation of the user device identification data by the server; waking, via the one or more processors, the telematic unit; and transmitting, via the one or more processors, the user device identification data to the telematic unit.

According to one aspect, the user identification data sent to the server includes a user identification, a user device identification, a password, a user device location, and a timestamp.

According to another aspect, the acts to perform further include receiving a login failure status message from the server upon successful validation of the user device identification data by the server; and displaying an error message on a display screen of the user device.

According to another example, one or more non-transitory computer readable media storing computer-executable instructions that upon execution cause one or more processors on a server to perform acts is provided. The server is caused to perform receiving user device identification data from the user device for validating the user device; generating a user device authentication identification for the user device upon successful validation of the user device; storing the authentication identification on a database on the server; transmitting the user device authentication identification to the user device; receiving a ready message from the telematic unit; generating a random telematic unit docking station key; storing the random telematic unit docking station key and the ready message on the database on the server; and transmitting the random telematic unit docking station key to the telematic unit.

According to one aspect, the ready message includes a telematic unit identification, a GPS location of the user device, and a timestamp.

According to another aspect, the server is further caused to perform transmitting a login failure status message to the user device upon unsuccessful validation of the user device.

According to yet another example, a method for establishing a 3-way system identification between a server, a telematics unit (TU), and a user device is provided. The method includes generating, by at least one processor of the telematic unit, a random pair key; requesting, by the at least one processor of the telematic unit, user device information from the user device; transmitting, by at least one processor of the user device, user device information to the telematic unit via short range communication; transmitting, by the at least one processor of the telematic unit, the user device information to the server; retrieving, by at least one processor of the server, a login status associated with the user device from a database on the server; requesting, by the at least one processor of the telematic unit, a pairing request from the server upon successful login by the user device; requesting, by the at least one processor of the server, a device pairing with the user device causing the user device to request pairing information from the telematic unit; transmitting, by the at least one processor of the telematic unit, the pairing information to the user device, the pairing information includes a copy of the random pair key; and transmitting, by the at least one processor of the user device, the pairing information to the server for validating the device pairing with the user device from telematic unit, the pairing information includes the copy of the random pair key.

According to one aspect, the copy of the random pair key is transmitted to the user device via short range communication.

According to yet another aspect, the copy of the random pair key is transmitted to the server via a cloud communication.

According to yet another aspect, the user device information is requested from the user device via short range communication.

According to yet another aspect, the pairing request includes a user identification, a user device identification, a telematic unit identification, the copy of the random pair key, a user device location, and a timestamp.

According to yet another aspect, the method further includes comparing, by the server, the copy of the random pair key received from the user device to the random pair key sent by the telematic unit.

According to yet another aspect, the random pair key and the copy of the random pair key are transmitted to the server asynchronously.

According to yet another aspect, the method further includes transmitting, by the at least one processor of the server, device pair success to the telematic unit; and transmitting, by the at least one processor of the telematic unit, the device pair success to the user device.

According to yet another aspect, the pairing information includes a user identification, a user device identification, a pair timestamp, the copy of the random pair key, and a docking station key.

According to yet another example, a method for establishing a 3-way system identification between a server, a telematics unit (TU), and a user device is provided. The method includes generating, by at least one processor of the server, a random pair key; requesting, by the at least one processor of the server, user device information from the user device; transmitting, by at least one processor of the user device, user device information to the server; retrieving, by at least one processor of the server, a login status associated with the user device from a database on the server; transmitting, by the at least one processor of the server, a login status to the user device; transmitting, by the at least one processor of the user device, the login status to the telematic unit; requesting, by the at least one processor of the telematic unit, a pairing request from the server upon successful login by the user device; transmitting, by the at least one processor of the telematic unit, a device pairing request with the server; transmitting, by the at least one processor of the server, a copy of the random pair key to the telematic unit; transmitting, by the at least one processor of the server, the device pairing request and the copy of the random pair key; transmitting, by the at least one processor of the user device, a request for pairing information to the telematic unit; transmitting, by the at least one processor of the telematic unit, a docking station key and a pair timestamp; and transmitting, by the at least one processor of the user device, a pairing response to the server, the pairing response including a copy of the random pair key.

According to one aspect, the pairing request includes a user identification, a user device identification, a telematic unit identification, the copy of the random pair key, a user device location, and a timestamp.

According to yet another aspect, the method further includes comparing, by the server, the copy of the random pair key received from the user device to the random pair key generated by the server.

According to yet another aspect, the method further includes transmitting, by the at least one processor of the server, a device pairing success message to the telematic unit; and transmitting, by the at least one processor of the telematic unit, the device pairing success message to the user device.

According to yet another aspect, the pairing information includes a user identification, the user device identification, a pair timestamp, the copy of the random pair key, and the docking station key.

DETAILED DESCRIPTION

Figure 1:
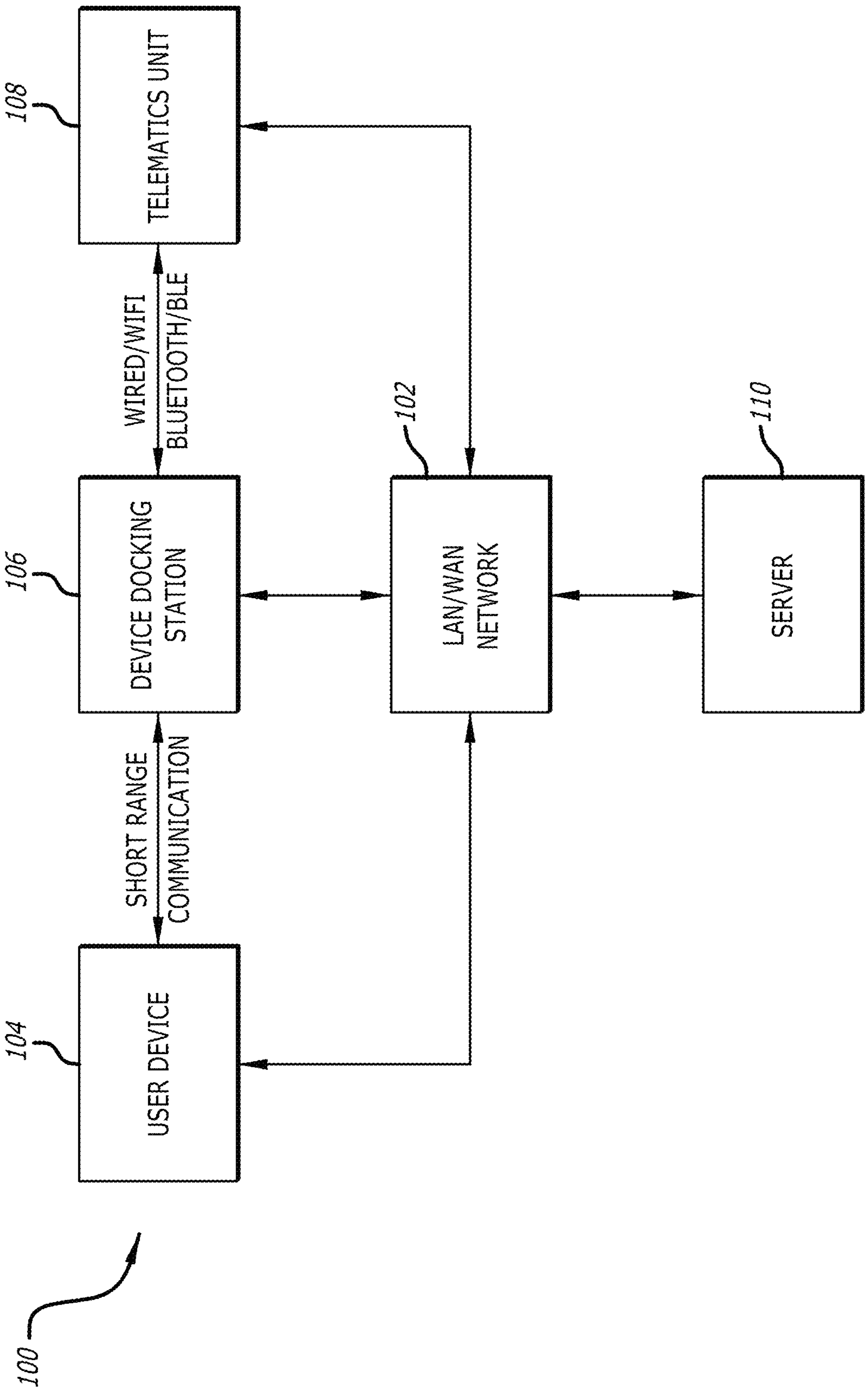
FIG. 1 illustrates an example architecture for generating and calculating driver insurance and risk management scores for a driver based on the vehicle and driver behavior data collected during driving sessions, according to various aspects of the present disclosure.

In the following description, specific details are given to provide a thorough understanding of the embodiments. However, it will be understood by one of ordinary skill in the art that the embodiments may be practiced without these specific details.

Terms

The term "sensor" may refer to any type of known sensor for sensing the dynamic conditions of a vehicle. The sensors can be stock equipment or after-market tools. The sensors can include, but are not limited to, mass airflow sensors, engine speed sensors, oxygen sensors, spark knock sensors, coolant sensors, manifold absolute pressure sensors, fuel temperature sensors, voltage sensors, camshaft position sensors, throttle position sensors, vehicle speed sensors or speedometers, proximity sensors, accelerometers, Global Positioning Systems, odometer, steering angle sensors, safety system data, radio detection and ranging (RADAR), light detection and ranging (LIDAR) and diagnostic trouble codes.

The terms "sensor data" and "vehicle sensor data" may refer to data received from any sensor on the car whether it is stock equipment or after-market tools.

The terms "in-vehicle sensor system" refers to sensors mounted in a vehicle that sense the dynamic conditions of a vehicle.

The terms "server" and "remote server" may be used interchangeably.

The term "vehicle" may refer to any type of machine that transports people or cargo including, but not limited to, cars, trucks, buses, motorcycles, airplanes, and helicopters.

The terms "driver" and "user" may be used interchangeably.

The terms "telematic device" and "telematic unit" refer to the combination of telecommunications and information technology to transmit and receive data over long distances.

The term "edge" as used herein refers to devices, units, or modules that are located on the edge of a network, collecting and transmitting data to a central system or server. By processing data locally on the edge device, such as the telematic unit before transmitting the data, efficiency in data transmission and analysis is improved while latency is reduced.

The term "risky event" may refer to any occurrence or incident that happens while driving that will negatively affect the performance of the driver and may include, but is not limited to, braking at a certain speed, accelerating at a certain speed, a tailgate time before a collision, corning at a certain speed, trip time, trip mileage, failing to stop at a stop sign, a rolling stop, a full stop, speeding miles, cost of the trip, start time of trip, stop time of trip, trip status, and trip score.

Several methods described herein may be implemented in hardware, such as a server, user device, and telematics unit. Each of these devices may determine if a risky event has occurred, generate a driver score, and transmit accident data to emergency response vehicles by cellular and/or other network communications.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "central processing unit", "processor", "processor circuit", and "processing circuit", and variations thereof, as used herein, are used interchangeably and include, but are not limited to, a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general-purpose processor may include a microprocessor, as well as any conventional processor, controller, microcontroller, or state machine. The processor may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processors are for illustration and other suitable configurations within the scope of the disclosure are also contemplated. Furthermore, the processor may be implemented as one or more processors, one or more controllers, and/or other structure configured to execute executable programming.

The terms "determine," "calculate," "generate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

The terms "user device" may refer to a mobile phone, a personal computer, a smart phone, a tablet, a portable computer, a machine, an entertainment device, or any other electronic device having circuitry.

The term "driver" may refer to a person or the vehicle.

The term "driver session" may refer to a trip made in a vehicle by a driver.

The term "trip" may refer to a journey or excursion undertaken with a vehicle. The trip begins at a designated starting location, such as a home, workplace, or specific address, and ends at a destination.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. As used herein, a reference to an element in the singular contemplates the reference to the element in the plural.

Overview

Driver insurance and risk management scores are calculated per individual driver based on vehicle and driver behavior data collected during driving sessions. Often one vehicle is shared by multiple drivers and one driver can drive multiple vehicles. The systems, apparatuses, and methods for tracking historic driver data on vehicles of the present disclosure securely track individual drivers, store, and retrieve associated driver data for analysis on the edge (vehicle) in near real time. The data collected may be analyzed at various time intervals (e.g., each trip, daily, monthly) to generate the scores.

The systems, apparatuses, and methods for tracking historic driver data on vehicles of the present disclosure minimizes cost associated with data transmission and cloud storage, tracks long term driver driving history on the edge for near real time analysis of driver behavior, minimizes driver distraction due to a user device while driving, securely stores and retrieves driver driving data on the edge device associated with the driver, restricts access to the driver driving data, and restricts user device access to remote servers and Telematic units.

In the present application, data "on the edge" refers to storing data on the telematic unit and/or user device as opposed to storing data on the cloud.

Minimize Cost Associated with Data Transmission and Cloud Storage

Insurance companies offer vehicle insurance to many customers. Telematic based insurance premium calculation requires access to the drivers' vehicle data. The vehicle data captures the various driving risky behaviors captured through vehicle sensors. Sending all the vehicle sensor data per customer per vehicle per trip to the remote server for analysis can lead to a significant increase in both transmission and storage cost for insurance companies. Over the last few years vehicles have been equipped with more advanced sensors (Advanced Driver Assistance System, Driver Monitoring System) for a safer driving experience. These advanced sensors produce data at an exceedingly high frequency and analysis of this data on the cloud can be cost prohibitive. The proposed system described below describes a method to successfully store driver historical data on the edge and minimize frequent communication with the remote server.

Track Long Term Driver Driving History on the Edge for Near Real Time Analysis of Driver Behavior Calculating driver scores requires access to historic and present driving behavior data for a particular driver and vehicle. As mentioned above, a driver may drive multiple vehicles, therefore it is essential for the algorithm to have the up-to-date historic driver data in near real time for analysis. Prior art systems require transmitting current data to the cloud for historic analysis for all drivers, which requires a significant cloud infrastructure and cost. The present disclosure's ability to identify the driver and securely store and retrieve driver driving data on the edge is beneficial as it improves the efficiency in data transmission and analysis as well as reducing latency.

Minimize Driver Distraction Due to User Device while Driving

It is well known that distraction is a leading cause of accidents. Placing a user device on a docking station in the vehicle, as in the present disclosure, provides easy access, visualization, and audio reminding the driver if the user device is removed while the vehicle is in motion may serve as a deterrent.

Securely Store and Retrieve Driver Driving Data on the Edge Device Associated with the Driver In the systems, methods, and apparatuses of the present disclosure, the historic driving data of the driver is stored on a user device. The data on the user device is encrypted so that no entity or individual(s) can easily view or edit the data stored on the user device. The encryption/decryption key for the encrypted data is maintained by the remote server. Neither the user device nor the Telematics Unit (TU) can view or edit the driver data independently. The driver data can only be used when the following conditions are met: (1) the user is logged into the remote server, (2) the user device is present in the vehicle, (3) the user device is paired and authenticated with the TU in the vehicle, and (4) the driver is identified using biometric identification, such as facial image recognition. Once these conditions are met, the TU can receive the driver data stored in the user device and decrypt it using the key provided by the remote server. This unique process increases security and securely handles personally identifiable information belonging to the driver.

Restrict Access to the Driver Driving Data

The driver data can only be retrieved and decrypted if the driver associated with the data is present in the vehicle and the driver is identified using biometric identification, such as facial image recognition. The historic driver driving data is stored in the driver's user device as well as in the remote server. The data is encrypted by the TU before sharing it with the user device and the remote server. The key is maintained only in the remote server and may be changed at the end of each driving session, further increasing the security and privacy.

Restrict User Device Access to Remote Server and Telematic Unit

The unique methods of the present disclosure include a sequence of authentication and validation steps. Each step requires success of the previous step to continue. The steps include: (1) The driver uses the user device to connect to the remote server for authentication, (2) The system pairing process authenticates and validates the user device with the TU and remote server, and (3) Biometric identification, such as facial image recognition, is used to identify the user on the edge. These steps progressively authenticate the driver and the user device to limit unsafe access to the TU and the emote server. By limiting the communication to the TU from the user device to short-range communication, malicious access to the vehicle network from outside of the vehicle is limited. Furthermore, there is also an audit trail of access to the TU by a user device that is tracked in the remote server.

Additional novel aspects of the present disclosure include (1) 3-way system authentication and validation; (2) independent communication path between the user device, the TU, and the remote server; (3) driver historic driver data storage on the edge; (4) minimizing data transmission and storage on the remote server; (5) unique entity generated IDs (keys) for session-based authentication; (6) session based shared driver identification; and (7) the data for each driver is uniquely protected.

With 3-way system authentication and validation, the system has a 3-step process for authenticating. First, the user is authenticated by the remote server using an application running on the user device. Second, system level pairing and authentication between the user device, the TU and the remote server. Third, driver recognition using biometric identification, such as facial image recognition, at the edge.

With an independent communication path between the user device, the TU, and the remote server, the present disclosure provides for asynchronous communication of data for authentication. For example, the TU may send unique validation data to the user device via a short-range communication path and share the same data with the remote server. The remote server can then request the user device to send the same data via a wide area network (WAN) communication path and then use the data it received from both devices independently via different paths to validate and authenticate the user device access to the TU and the remote server.

With driver historic driver data storage on the edge, the present disclosure provides for storing the driver's historic driving data on the driver's user device. Once a driving session starts, the TU requests the driver's historic driver data from the user device and then sends a request to the remote server for the decryption key, decrypts the historic driving data, and updates the historic driver data based on based driving risk events. Once the trip is complete, the TU then encrypts the historic driver data using the key provided by the remote server and sends the encrypted historic driver data to the user device and remote server for storage. In the present disclosure, driver identification using biometric identification, such as facial image recognition, is used to ensure the correct driver data is retrieved and updated. The separation of the symmetric key and data storage further enhances security as both parties must come together for the data to be read properly.

In the present disclosure, neither the user device nor the TU can decrypt and update the historic driver data without the driver and driver's user device being present in the vehicle and having already gone through the 3-step authentication process.

The present disclosure provides for many approaches to minimize data transmission to the remote server. For example, instead of activating the TU to communicate with the remote server the moment the TU recognizes the presence of a user device on the docking station in the vehicle, the TU waits for the user device to indicate when the remote server has successfully authenticated the driver credentials. If the TU can obtain the driver's historic driver data from the driver's user device, the TU does not have to request the historic driver data from the remote server, significantly reduces data transmission. Furthermore, the TU's communication with the remote server is initiated only after the vehicle has reached a predefined speed and distance as opposed to placing a user device on the docking station or when the vehicle ignition is On.

With unique entity generated identifications (IDs), such as single symmetric keys, for session-based authentication, the remote server and the TU generate new random IDs or keys and share them with the other 2 entities for return receipt enabling the originating entity to validate it is communicating with the correct remote end to whom it has sent the random IDs or keys.

With session based shared driver identification, the present disclosure provides for session based shared driver identification responsibility between the user device (such as a smartphone) and the TU on the edge. The TU takes an image of the cabin (or interior of the vehicle) and crops the image to contain only the facial image of the driver and sends the image, via NFC or short-range communication enabled mount, to the user device. Driver authentication occurs on the user device which then shares the results of the authentication with the TU.

With uniquely protecting the data of each driver, each driver has their own single symmetric key which is only stored on the remote server.

FIG. 1 illustrates an example architecture 100 for generating and calculating driver insurance scores and risk management scores for a driver based on the vehicle and driver behavior data collected during driving sessions within which embodiments of the systems and methods of the present disclosure may be found. The system includes a communication network 102 that connects a user device 104, a device docking station 106, a telematics unit 108, and a remote file system or server 110. The user device 104, the device docking station 106, the telematics unit 108, and the remote server 110 are described in more detail below.

The user device 104 communicates with the device docking station 106 (hereinafter referred to as "docking station") via short-range communication methods such as Near Field Communication (NFC) or USB. The docking station 106, which may be equipped with wireless charging and USB power, is placed in the vehicle close to the driver for easy visualization of the display and driver interaction. Once the vehicle is in motion, removing the user device 104 from the docking station 106 causes the user device 104 to generate an audible alert and an appropriate driver risk event is generated. The docking station 106 may be connected to the Telematics Unit (TU) 108 using Wi-Fi, a physical serial interface (USB), or Bluetooth. The user device 104 communicates with the TU 108 through the docking station 106 to ensure that the user device 104 is always on the docking station 106 in the vehicle. Ensuring the user device 104 is always on the docking station 106 has at least two (2) benefits. First, it helps limit user device-based distraction and ensures the user device 104 is in the same vehicle as the TU 108 it is connected to. The TU 108 and the user device 104 communicate with the remote server 110 independently via wide area network-based communication technologies such as Long-Term Evolution (LTE). The communication system 100 may employ at least two different communication paths between the remote server 110, the TU 108, and the user device 104 so that it can independently verify the data received from the user devices. The communication system 100 may also implement industry standard communication security measures such as a private/public key for end-to-end encryption and Transport Layer Security protocols for securing the end-to-end communication.

Communication between any or all of the apparatuses, devices, systems, functions, modules, and servers described herein may be made through one or more wired and/or wireless communication network(s) 102. Examples of communication network(s) 102 include a public switched telephone network (PSTN), a wide area network (WAN), a local area network (LAN), a TCP/IP data network such as the Internet, and a wireless network such as the 3G, 4G, LTE, and 5G networks promulgated by the Third Generation Partnership Project (3GPP). The communication networks (s) 102 may be any one or combination of two or more communication networks such as, but not limited to, the just-mentioned communication networks.

Figure 2:
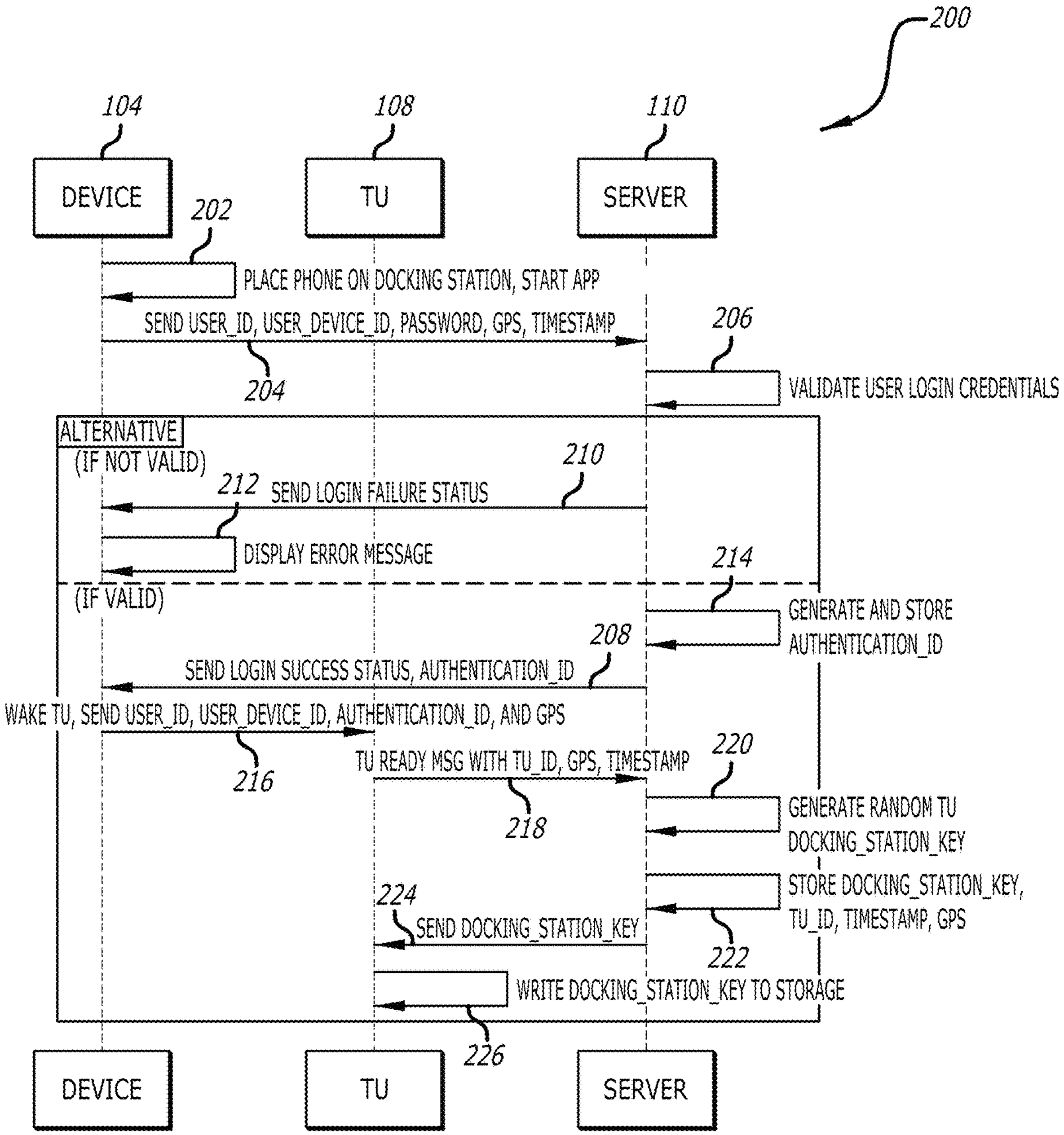
FIG. 2 is a flow diagram illustrating a user device login validation sequence for validating login credentials of a user device and a driver with the telematics unit and remote server.

FIG. 2 is a flow diagram illustrating a user device login validation sequence for validating the login credentials of the user device and the driver with the telematics unit and the remote server 200. The user device login validation sequence establishes the first connection between the user device, the telematics unit, and the remote server as well as validates the login credentials of the user device to determine if the telematics unit needs to be woken up.

First, the user device is placed on a mount or docking station, in the vehicle, connected to the telematics unit, enabling short range communication connectivity (SRCC) upon successful login 202. Next, the user device sends its login information (i.e. user identification and user device identification) to the remote server alongside a GPS location of the user device (i.e. user device location) and timestamp indicating when the log in information is requested, validating the login credentials with the remote server 204. The GPS location (i.e. user device location) and timestamp serve to double check and ensure that the location and the time of the session are the same across the TU and the user device. The remote server may then validate the user login credentials 206 and send either a login success status 208 or login failure status message 210 to the user device. In the event of a login failure, the user device displays an error, and the sequence terminates 212.

In the event of a login success, the remote server generates an authentication identification (ID) and stores the ID along with the login credentials for the user device 214. Next, the remote server sends the authentication ID to the user device showing the login was authenticated 208. The user device then wakes up the TU and sends the TU the same information (i.e., user ID, user device ID, GPS location) alongside the authentication ID 216. The TU then transmits a ready message to the remote server with its own telematic unit ID, GPS location, and timestamp 218.

Once the remote server receives this information from the TU, the remote server generates a random key for the session (i.e. a docking station key) 220 that will be used to validate the TU communication and writes, or records, this key to memory or a database on the remote server 222. The key is then sent or transmitted from the remote server to the TU 224 which writes, or records, the docking station key to storage/memory on the TU 226. With this sequence, the login is successfully validated by the remote server, and a key is generated to communicate between the TU and the remote server securely.

Figure 3:
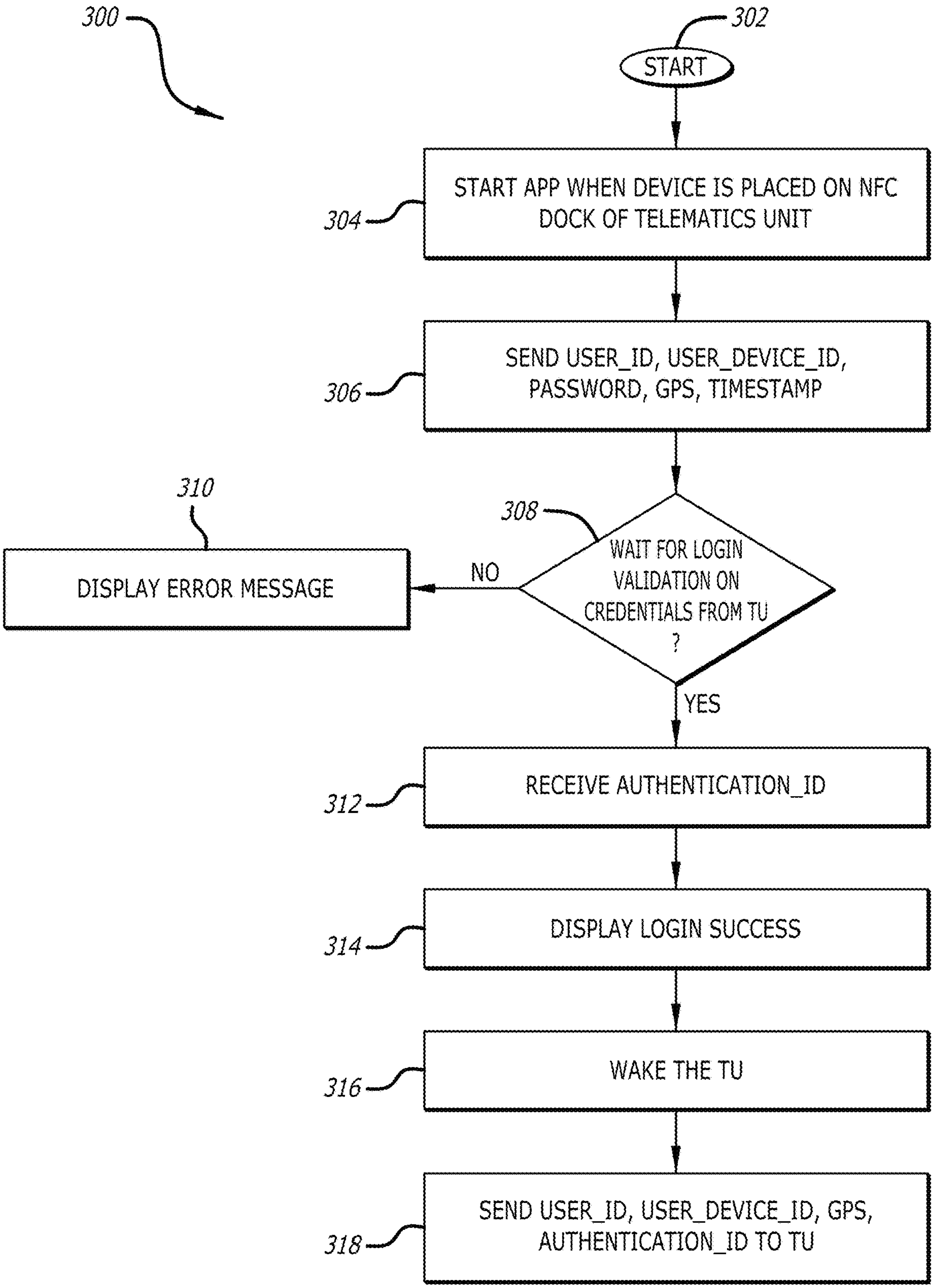
FIG. 3 is a flow diagram illustrating the user device login validation.

FIG. 3 is a flow diagram illustrating the user device login validation 300. To begin the validation process and allow the driver to log in 302, the driver places a user device on an NFC dock (i.e. docking station) in communication with the telematics unit 304. Next, the user device sends the login info, as well as the GPS location (i.e. user device location) and the timestamp, to the TU 306 and then waits to receive login authentication from the TU 308. In the event of login failure, the user device receives a failure message from the TU and an error message is displayed on the display screen of the user device 310. In the event of login success, the user device receives a success message along with an authentication ID for the driving session 312. The user device then displays a login success message 314 and wakes up the TU 316. Once the TU is woken up, the user device sends all the relevant information to the TU, alongside the authentication ID 318. The relevant information includes the user ID, the user device ID, the GPS location, and the authentication ID.

Figure 4:
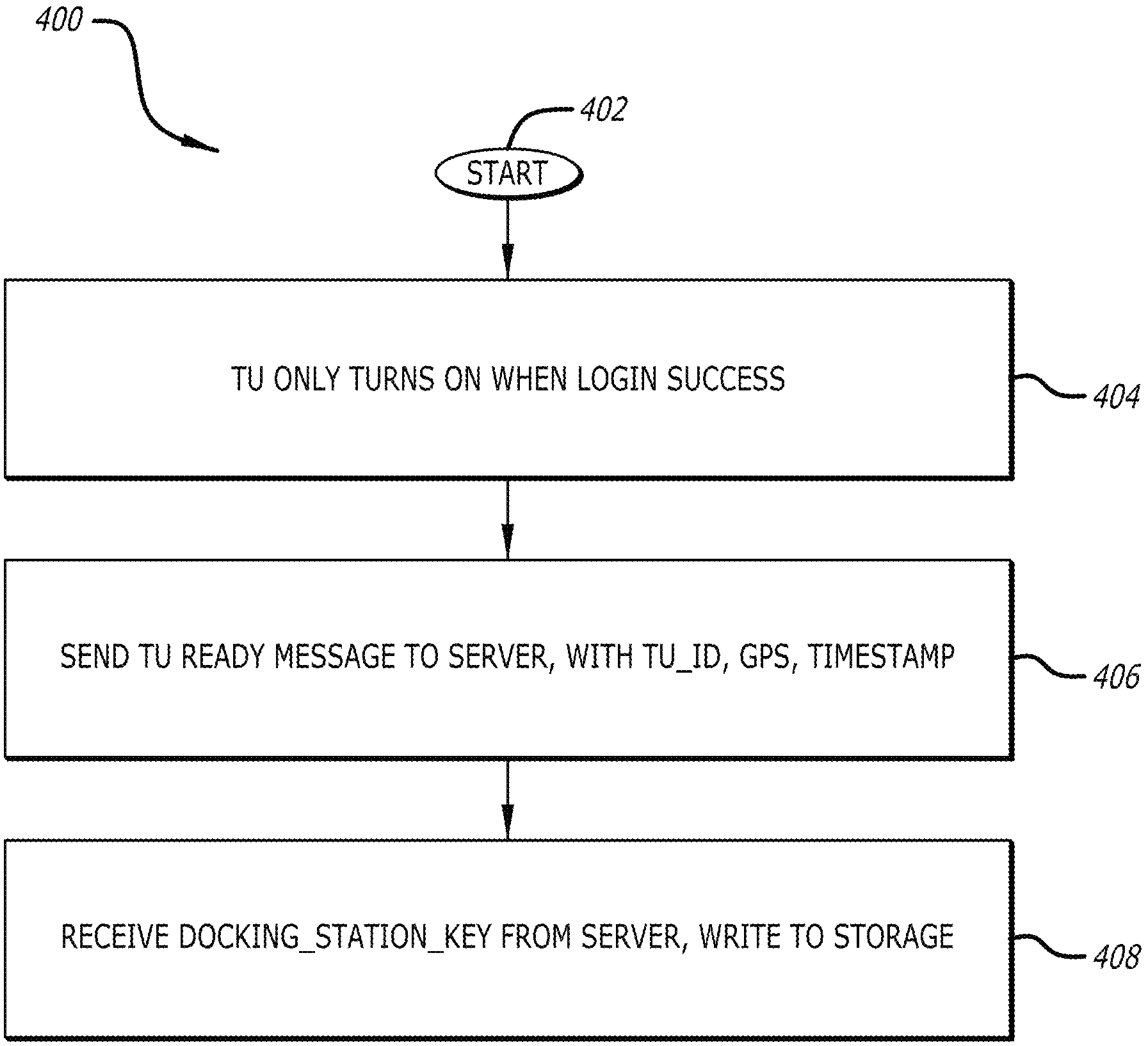
FIG. 4 is a flow diagram illustrating the user device login validation on the telematics unit (TU).

FIG. 4 is a flow diagram illustrating the user device login validation process on the telematics unit (TU) 400. The TU begins in the Off position 402 and turns On only upon a successful login 404. Next, the user device sends a ready message to the remote server with the TU ID and its GPS location (i.e. user device location) and timestamp 406. After sending the ready message, the TU waits to receive a docking station key that is randomly generated by the remote server and writes/records/saves docking station key to storage/memory 408.

Figure 5:
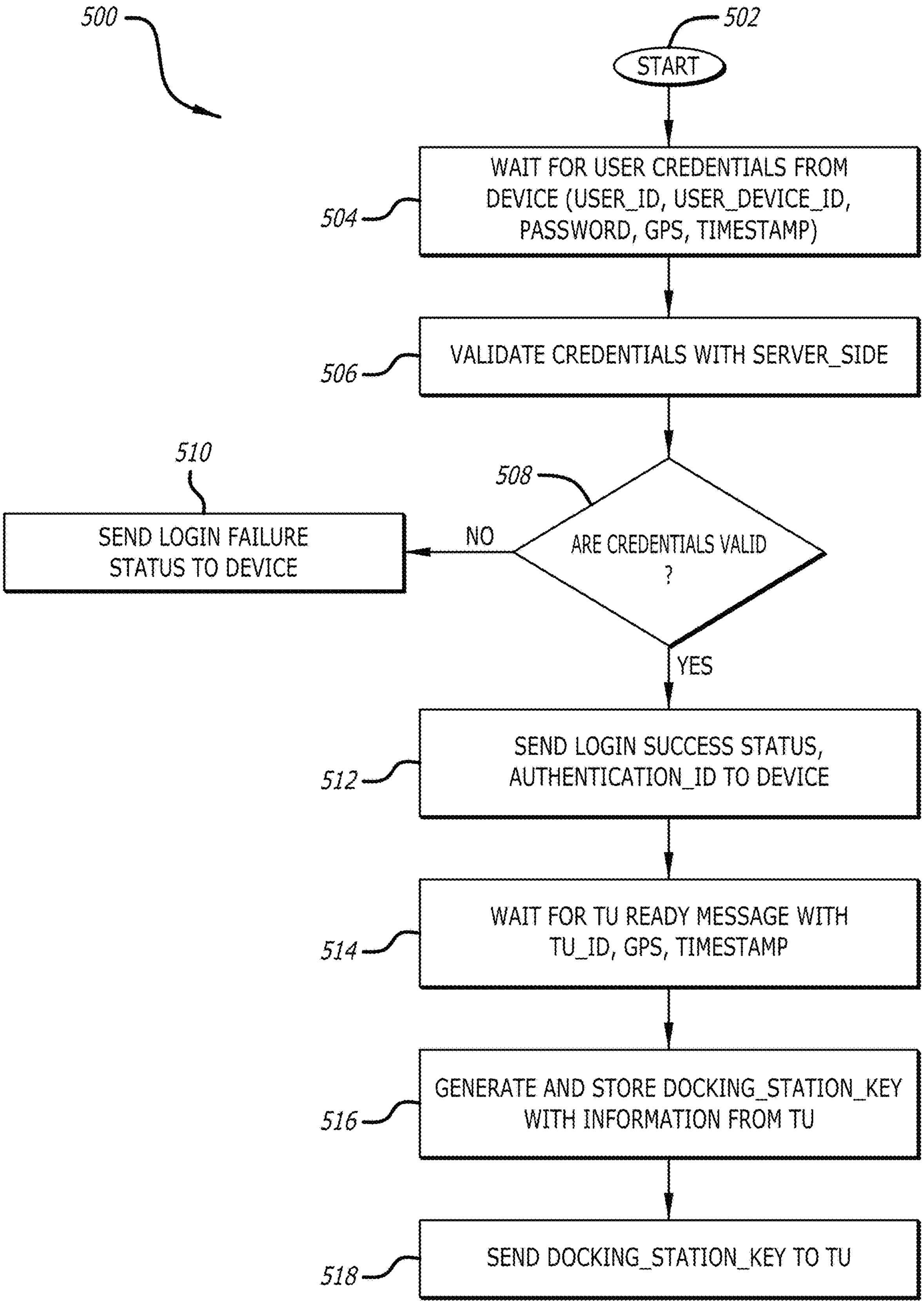
FIG. 5 is a flow diagram illustrating the user device login validation on the server.

FIG. 5 is a flow diagram illustrating the user device login validation process on the remote server 500. To begin 502, the remote server waits for the user device to send the login information (i.e., user ID, user device ID, password, GPS location, timestamp) 504. Once received, the remote server validates the user credentials with credentials stored on the remote server 506. Next, a determination is made as to whether the credentials are valid 508. If the credentials are not valid, the remote server sends a login failure status message to the user device and the sequence terminates (i.e., login failed) 510. If the credentials are valid, in the event of login success, the remote server generates and stores an authentication ID and transmits the authentication ID to the user device, alongside a login success status 512. The remote server then waits for a ready message containing the TU ID, GPS location, and timestamp from the TU 514. Once the remote server receives the ready message and the TU ID, GPS location, and timestamp from the TU, the remote server generates a docking station key, saves the key to storage/memory/database, and transmits the key to the TU 518.

Figure 6:
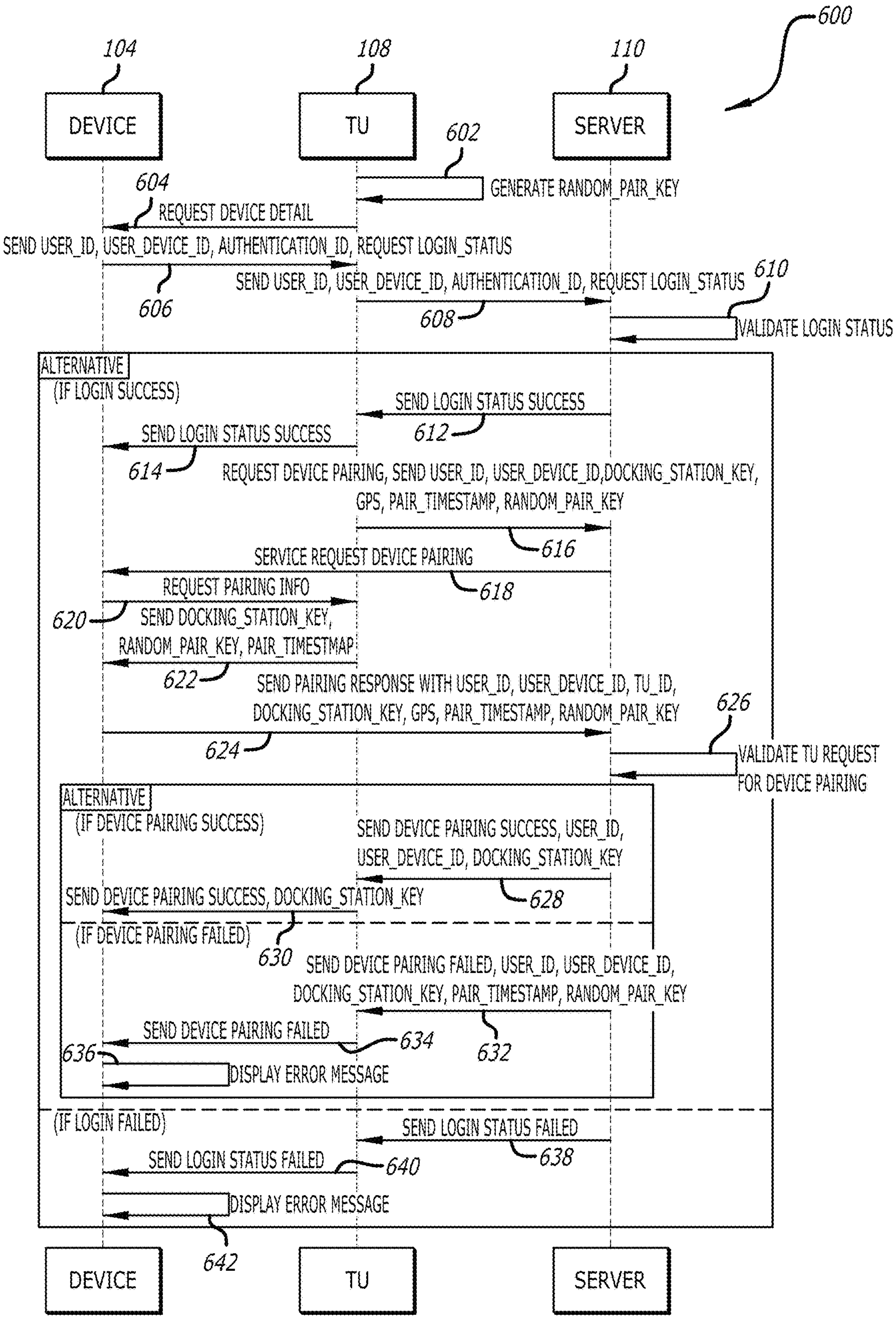
FIG. 6 is a flow diagram illustrating the system pairing sequence.

FIG. 6 is a flow diagram illustrating the system pairing sequence 600. The system pairing establishes a 3-way system identification between the remote server, the telematics unit (TU) and the user device. The successful completion of system pairing means each device (i.e., the user device, the recognizes the identity of the other devices it is in communication with. System pairing is accomplished by the TU (random pair key) and the remote server (docking station key) generating their own unique random keys for each session request and sharing these keys via different communication paths asynchronously and based on a request/response method.

This approach is a 2-step process and ensures that the user device is physically connected to the docking station of the TU in the vehicle, via short range communication connectivity, and is connected to the correct TU at the time of request. First, the TU verifies that the user device is authenticated by the remote server and is connected via short range communication. Next, the remote server verifies the identities of both the TU and the user device independently and enables their communication not only between the TU and the user device, but also with the remote server for that driving session. At the beginning of each driving session, new unique keys are generated to ensure old keys cannot be used to enable communication among the entities/devices.

Once the TU is woken up for communication, it generates a random pair key 602. Each TU generates its own unique random pair key for each session and shares the first random pair key with the connected user device via short-range communication methods (e.g., NFC) and the remote server via a cloud connection. The TU then requests user device details from the connected user device via short range communication 604. Requesting the details via short range communication ensures that the connected user device is located inside the vehicle and docked on the docking station of the TU.

Next, the user device transmits the logged in remote server authenticated user ID, user device ID, authentication ID, and the login status to the TU 606. The user ID is unique to each user or driver of the user device and is authenticated during the user device login driving session. The authentication ID generated by the remote server is a unique ID for each user device login driving session. The user device also shares the login status. The TU then transmits the connected user ID, user device ID, authentication ID, and login status to the remote server for further validation of the information provided by the user device 608. The remote server may then attempt to retrieve the login status for the supplied user ID, user device ID, and the authentication ID from the data stored in the database on the remote server 610. The remote server then compares the retrieved login status with the supplied login status to ensure the status is correct and returns the login status to the TU 612. If the returned login status is a success (True), the TU will also inform the user device that the login has been validated 614.

If the login status is successful, the TU transmits a system pairing request to the remote server that includes the user ID, user device ID, TU ID, the remote server generated docking station key, TU generated random pair key, GPS location, and a pair timestamp 616. Once the remote server receives the TU request for system pairing, the remote server sends a system pairing request to the user device via cloud connectivity 618 and stores the data in the database/memory on the remote server for future comparison.

The user device, upon receiving the remote server device pairing request, requests pairing information from the TU via short range communication connectivity 620. This ensures that the user device is still connected to the TU via short range communication connectivity. The TU then sends the docking station key provided by the remote server, a copy of the random pair key and the pair timestamp to the user device via short range communication connectivity 622. The user device, after receiving the details/information from the TU, sends a pairing response that includes the user ID, user device ID, pair timestamp, the copy of the random pair key, and docking station key to the remote server via cloud connectivity 624. The remote server stores the data received from the user device and then validates the independently received responses from the TU and the user device by comparing the data sent by user device and the TU, including the copy of the random pair key sent by the user device and the random pair key generated by the TU 626. In other words, the remote server compares the data from the TU and the data from user device to ensure all three connected entities/devices are authenticated, can communicate in near real time asynchronously, and share unique random keys generated by the TU and the remote server. The random pair key and the copy of the random pair key are transmitted to the remote server asynchronously Upon successful completion of validation of the system pairing request, the remote server may then send a device pairing success status, user ID, user device ID, and docking station key to the TU 628. The TU may then send a system pairing success message (or device pairing success message) to the user device via short range communication connectivity 630.

Upon unsuccessful completion of the validation of the system pairing request, the remote server sends a device pairing failure status, user ID, user device ID, and docking station key to the TU 632. The TU then sends a system pairing failed message to the user device via short range communication connectivity 634. The user device then displays an error message on its display screen 636. If the returned login status from the remote server is a failure (False) 638, the TU will also send a login failed status message to the user device 640 and the user device will display an error message on its display screen to the user/driver 642.

Figure 7A:
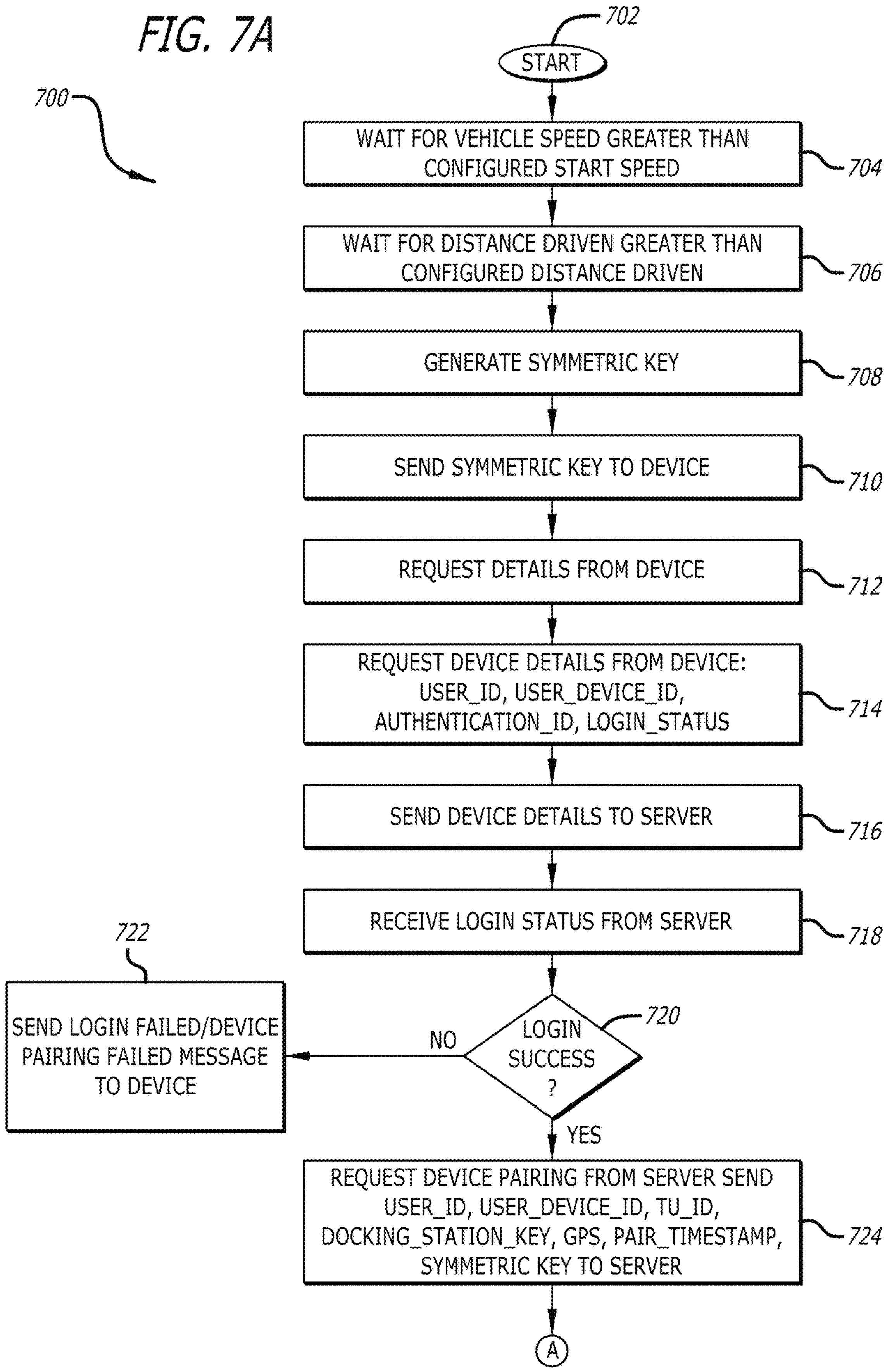
FIGS. 7A-7B are a flow diagram illustrating the system pairing telematics unit (TU) flow.
Figure 7B:
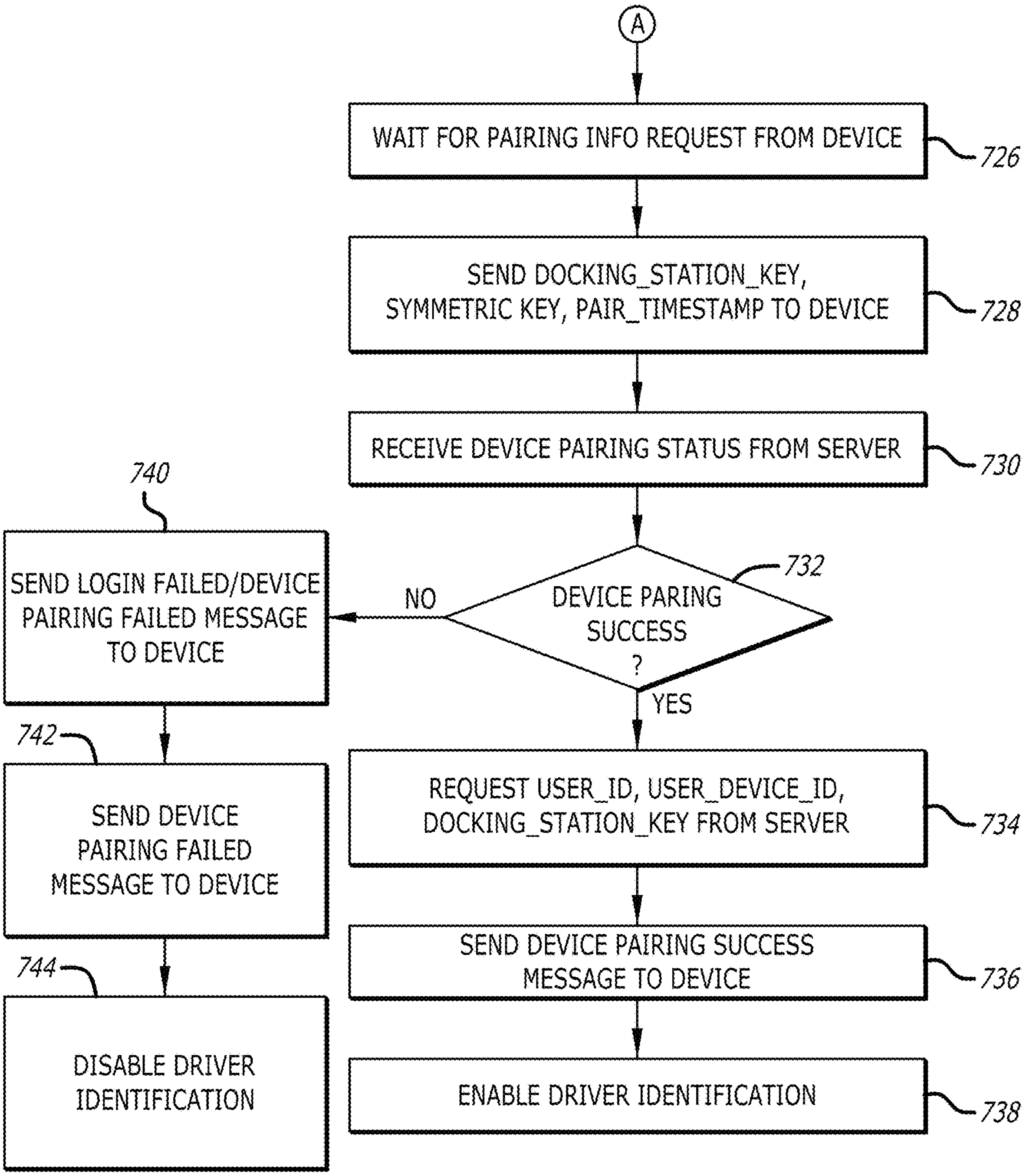

FIGS. 7A and 7B are a flow diagram illustrating the system pairing telematics unit (TU) flow 700. Once the TU is woken up for communication by the user device, the TU initiates the process of a system pairing sequence 702. The TU waits for the user device to attain a preconfigured start speed 704 to ensure a trip or driving session has started. A user can place their device on the docking station long before a trip or driving session begins and may remove the user device multiple times before the vehicle starts moving. This approach minimizes unnecessary cloud communication, cloud connectivity data cost and session management workload on the remote server.

Once the vehicle reaches the predefined speed, the TU further waits for the vehicle to travel a predefined distance to ensure that an actual trip has started 706. The predefined speed and the predefined distance may be set by the employer or manager. In one example, the predefined speed may be 20 mph and the predefined distance is one (1) mile. The TU then generates a new unique random pair key 708 for the trip session, stores the key, and sends the first random pair key to the user device 710.

Next, the TU sends a request to the user device for user device details via short range communication connectivity (SRCC) 712 and waits for a response from the user device. The request is sent via SRCC to ensure that the user device is on the docking station, and it is communicating with the user device while it is physically connected to the TU. On successful reception of user device details (user ID), user device ID, login status, and authentication ID) from the user device via SRCC 714, the TU sends a request to the remote server 716 via cloud connectivity for login status validation. The login status validation request contains the TU ID, user ID, user device ID, login status, and authentication ID. The login status is then received from the remote server 718. A determination is then made as to the success of the login and/or device pairing 720. If the login and/or device pairing fails, a failed message is sent to the user device and displayed 722.

If the TU receives a login status success from the remote server via cloud connectivity, the TU sends a login status success message to the user device via SRCC. Next, the TU sends a system pairing request to the remote server via cloud connectivity. The message will include a user ID, user device ID, TU ID, docking station key, GPS location (i.e. user device location), pair timestamp, and the random pair key 724. Once the TU receives the pairing info request from the user device 726, it sends the docking station key, its own random pair key, and pair timestamp to the user device 728.

If the TU receives the pairing status success from the remote server 730, it then checks to ensure the device pairing success message has the original parameters sent to the remote server for validation 732. If device pairing success has been achieved, the TU receives the user ID, user device ID, and docking station key from the remote server 734. The TU then sends a system (or device) pairing success message to the user device via SRCC 736 and driver identification is enabled 738.

Alternatively, if the TU receives a pairing status failure from the remote server, it then checks to ensure the success message has the original parameters sent to the remote server for validation 740 and sends a system pairing failure message to the user device via SRCC 742. Upon the pairing failure message, driver identification is disabled 744.

Figure 8:
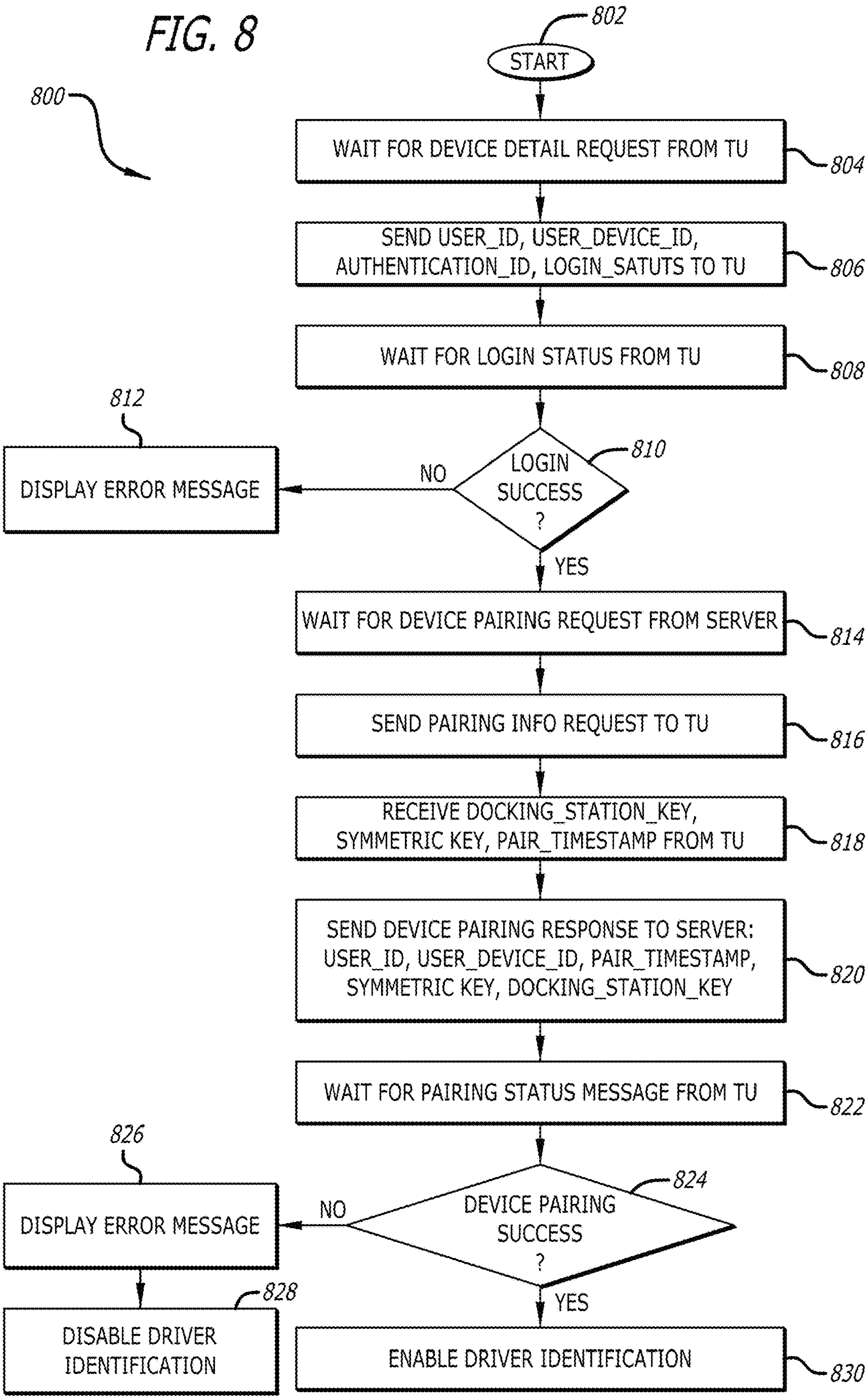
FIG. 8 is a flow diagram illustrating the system pairing user device flow.

FIG. 8 is a flow diagram illustrating the system pairing user device flow 800. First, the user device logs onto the remote server 802. Once the user device has successfully logged onto the remote server, it waits for the TU to request user device details 804. Upon receiving the user device detail request from the TU via SRCC, the user device sends the user ID, user device ID, login status, and authentication ID to the TU again via SRCC 806. The TU independently verifies with the remote server if the user device has been authenticated by the remote server for limiting unauthorized access by malicious user devices attempting to access the TU.

Next, the user device waits for the login status validation response from the TU via SRCC 808 to determine if the login has been successful 810. If the TU sends back a login status failed message, the user device displays an error message to the user and terminates the pairing process 812. If the user device receives a login status success message from the TU, it then waits for system pairing request from the server via cloud connectivity 814.

Upon receiving the system pairing request from the remote server, the user device sends a request to the TU via SRCC for pairing information 816. Once the pairing information (docking station key, the random pair key, and a pair timestamp) is received from the TU via SRCC 818, it responds to the remote server request for pairing by sending a pairing response message to the server via cloud connectivity 820. The message contains the user ID, user device ID, pair timestamp, a copy of the random pair key, and docking station key. It is important to note that TU ID is never shared with the user device, instead the driving session based random pair key generated by TU is shared with the user device. The user device does not receive any permanent identifiable information either from the server or TU.

Next, the user device waits for a system pairing status message from the TU via SRCC 822 to determine device pairing success 824. If the user device receives a system pairing failure message from the TU via SRCC, it displays an error message on its display screen 826, the process is terminated, driver identification will not take place, and the user device is disabled 828.

If the user device receives a system pairing success message from the TU via SRCC, it enables the next step of driver identification 830.

Figure 9:
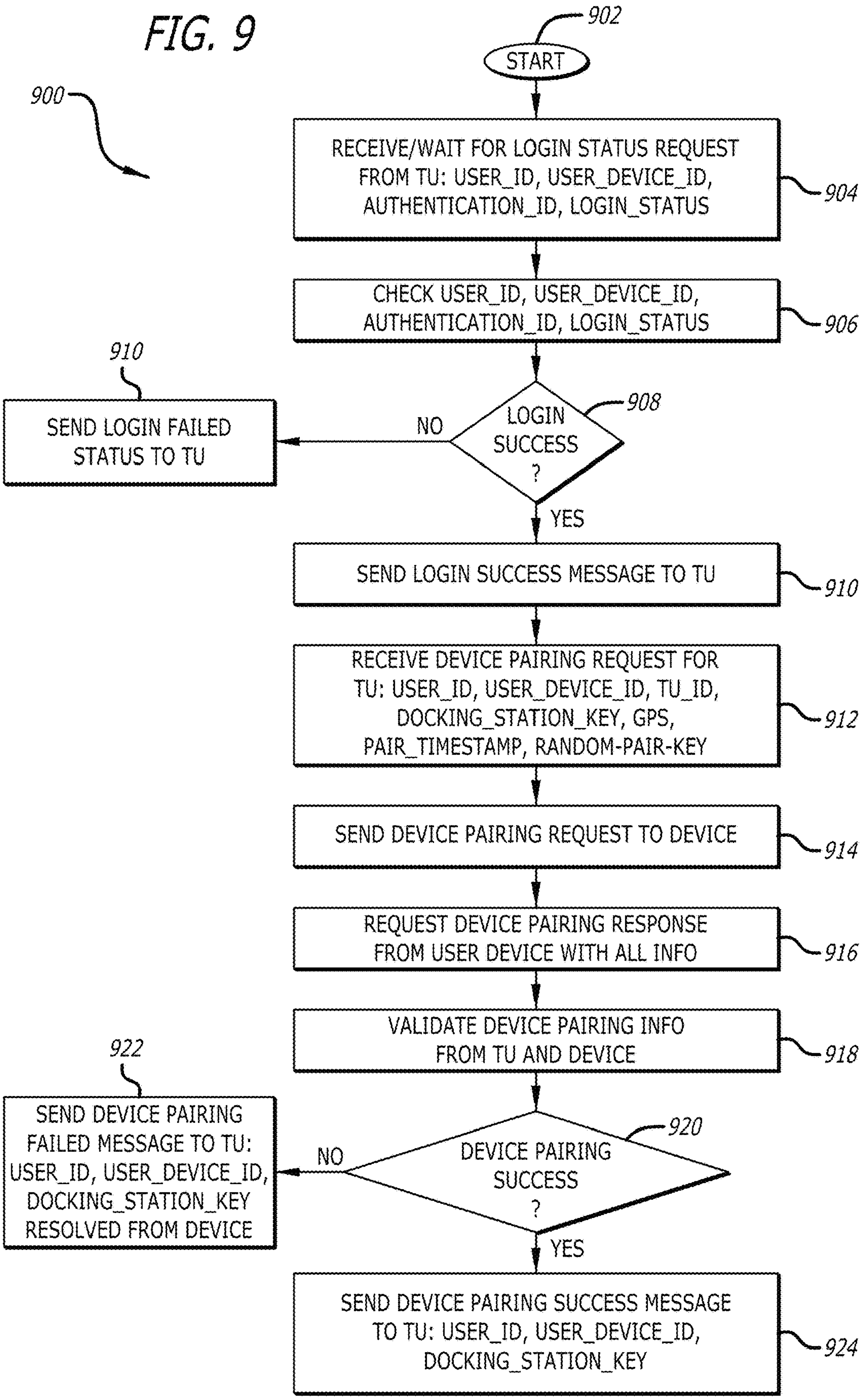
FIG. 9 is a flow diagram illustrating the system pairing remote server flow.

FIG. 9 is a flow diagram illustrating the system pairing remote server flow 900. The remote server acts as the control unit that not only authenticates the TU and the user device separately, but also validates if the TU and user device are allowed to communicate with each other 902. The remote server does this by receiving common validation data from the TU and the user device synchronously using request/response, and then comparing the data to make sure it is valid and the same. During the first step of user and user device authentication, the remote server authenticates the user device and waits for the TU to initiate the login status validation.

Once the login validation request is received with the user ID, user device ID, login status, and authentication ID from the TU 904, the remote server then compares the received data with the data stored in the database for the user ID, user device ID, and authentication ID 906 to determine if the login was successful 908. If a match is not found, then the login status check failed and the remote server sends a login status failed message to the TU via cloud connectivity and terminates further processing of system pairing process 910.

If a match is found, then the login status check is a success, and the remote server sends a login status success message to the TU and enables the system pairing process 910. Next, the remote server waits for the TU to initiate the system pairing request. Upon receiving the system pairing request from the TU with the user ID, user device ID, TU ID, docking station ID, GPS location, pair timestamp, and random pair key, it stores the data in the database on the remote server 912.

The remote server then sends a system pairing request to the corresponding user device via cloud connectivity based on the user ID and user device ID provided by the TU request 914. Next, the remote server receives the user device pairing response with user ID, user device ID, pair timestamp, random pair key, and docking station key from the corresponding user device via cloud connectivity 916. The remote server then validates 918 the data provided by the TU and corresponding data provided by the user device by comparing each parameter and checking to make sure the remote server generated docking station key belongs to the TU requesting the system pairing response 920.

If the validation is not successful, then the remote server sends a system pairing status failed message to the requesting TU along with the user ID, user device ID, docking station key received from the user device, and the TU ID received from the TU via cloud connectivity 924. If the validation is successful, the remote server sends a system (or device) pairing status success message to the requesting TU along with the user ID, user device ID, docking station key received from the user device, and the TU ID received from that TU via cloud connectivity 922.

Figure 10:
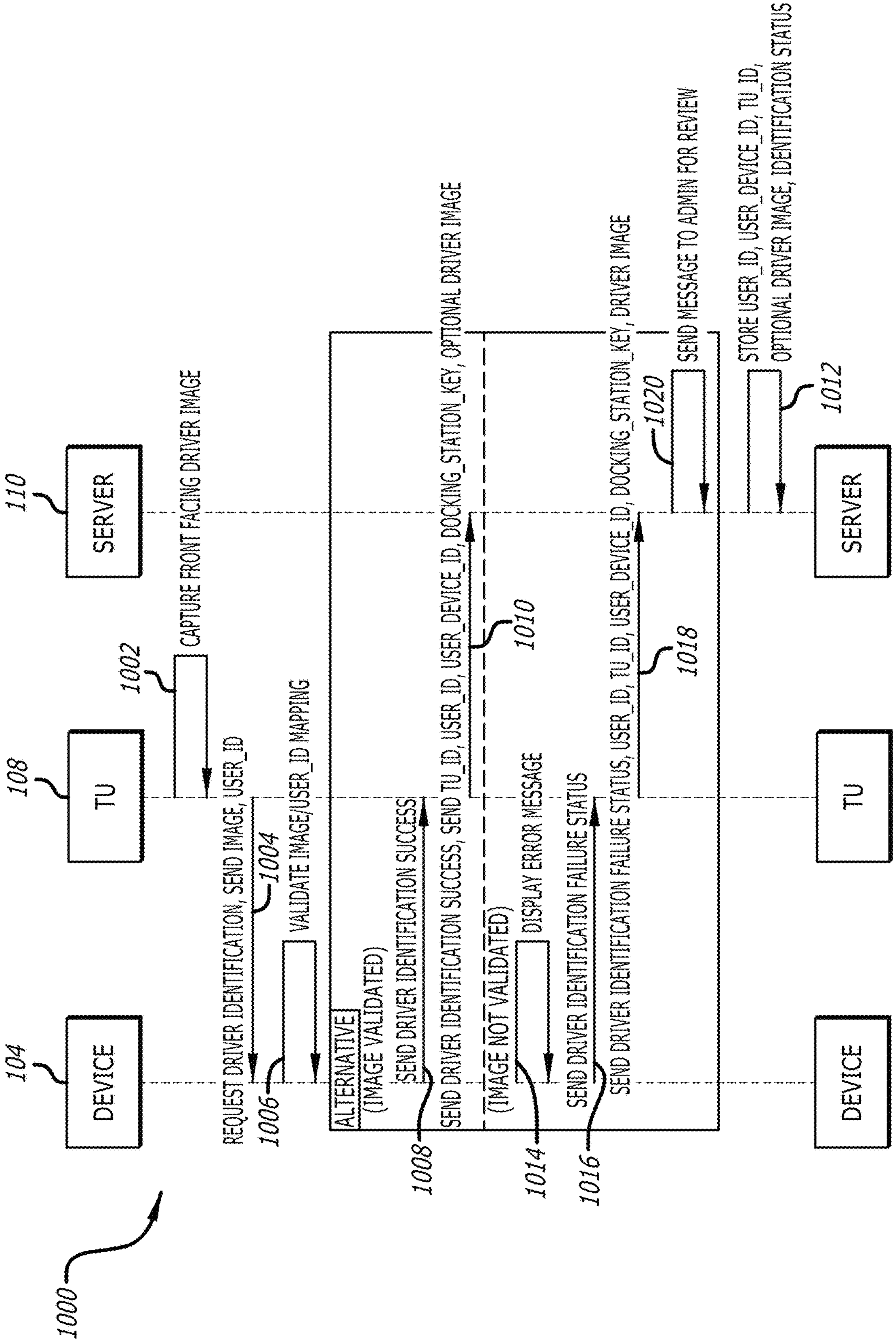
FIG. 10 is a flow diagram illustrating the driver identification sequence.

FIG. 10 is a flow diagram illustrating the driver identification sequence 1000. Upon successful completion of the system pairing process, the driver identification process may be initiated by the TU. First, the TU captures a front facing image of the driver 1002 and sends a driver identification request to the connected user device via SRCC 1004. The request contains a driver image and user ID.

The user device, upon receiving the driver image and user ID via SRCC from the TU, retrieves the facial image of the driver associated with the authenticated user ID and compares the user ID provided by the TU to ensure the user IDs are the same. The user device then performs facial identification between the stored facial images of the driver and the image provided by the TU. If driver identification is successful, the user device validates the image/user ID mapping 1006 and the user device sends a driver identification success message to the TU via SRCC 1008.

Upon receipt of a successful driver identification message from the connected user device via SRCC 1008, the TU sends a driver identification success message to the remote server via cloud connectivity 1010. The message contains the TU ID, user ID, user device ID, docking station ID, and optional driver image. The remote server, upon reception of the successful driver identification message, stores the success state to the database 1012.

If driver identification is unsuccessful, the user device displays an error message 1014 on its display screen and sends a driver identification failed message to the connected TU via SRCC 1016. Upon receipt of an unsuccessful driver identification message via SRCC, the TU sends a driver identification failure message to the remote server via cloud connectivity 1018. The message contains the TU ID, user ID, user device ID, docking station key, and a captured front facing driver image. The remote server, upon receipt of the driver identification failure message, saves the failure status to the database 1020 and sends a notification to the administrator of the system for further review.

Figure 11:
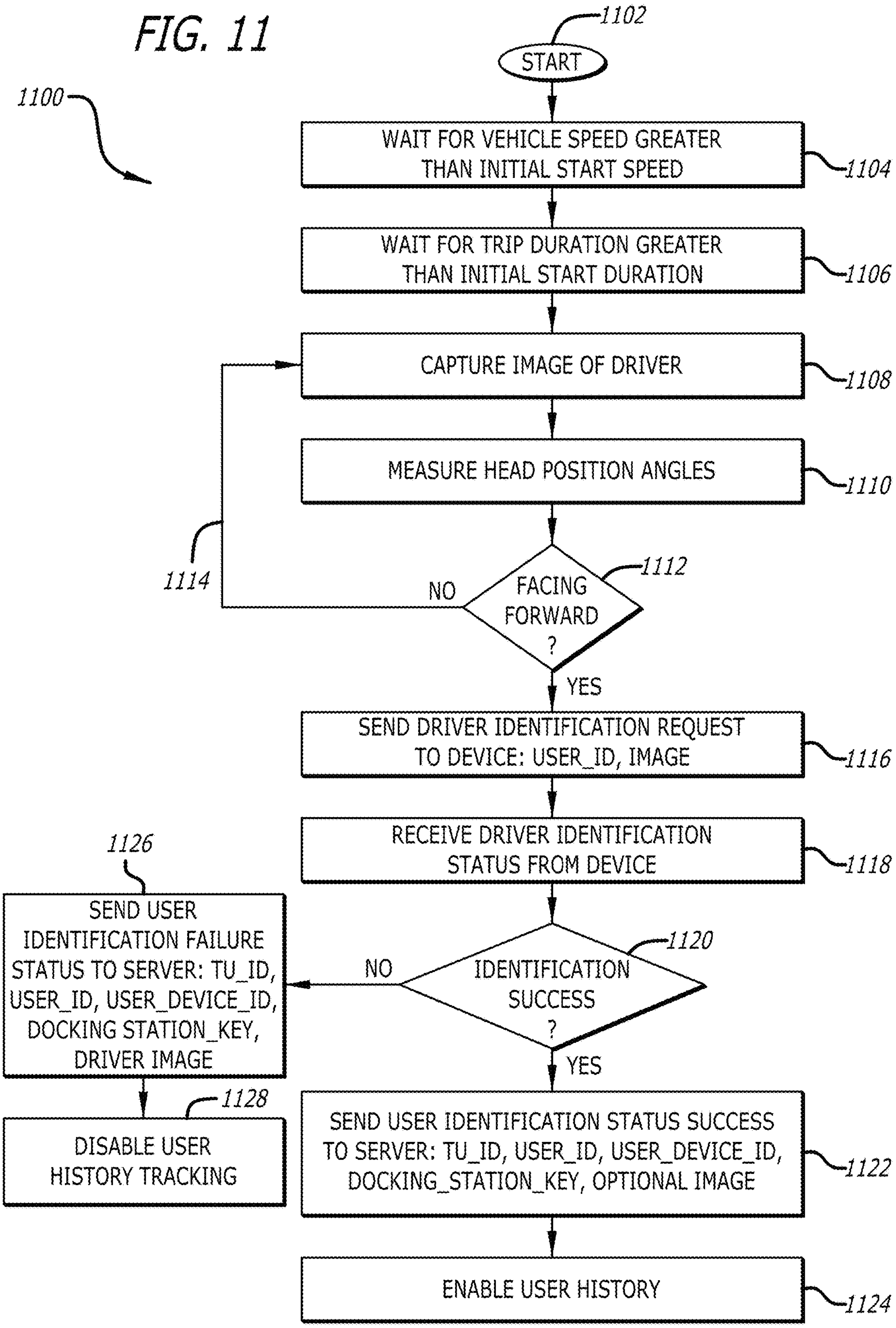
FIG. 11 is a flow diagram illustrating the driver identification TU flow.

FIG. 11 is a flow diagram illustrating the driver identification TU flow 1100. Upon successful completion of the system pairing process 1102, the TU may initiate a driver identification step with the connected user device via SRCC. The driver identification process begins when the vehicle speed is greater than an initial start speed 1104 and the trip duration is greater than the initial start duration time. The TU waits for the duration of the trip to be greater than the initial starting duration time 1106 for the TU to capture an in-cabin image of the driver 1108. In other words, once the vehicle begins moving, an image of the driver is captured. It then applies a face detection model to measure head position angles 1110 and identify facial images and crops the image so the TU contains only the driver image by selecting the facial image on the driver side of the vehicle.

Next, the TU verifies if the image is forward facing by applying a frontal face detection model to the driver face image 1112. If the detection is unsuccessful, the process is repeated until a front facing driver image is captured 1114. Upon successful capturing of a front facing driver image, the TU will send a driver identification message to the connected user device via SRCC 1116. The message will contain the front facing driver image and user ID.

Next, the TU waits for a driver identification status message from the connected user device via SRCC 1118 to determine if the identification has been successful 1120. Upon receipt of a driver identification success message from the user device, the TU sends a driver identification success message to the remote server via cloud connectivity 1122. The driver identification success message to the remote server may contain the TU ID, user ID, user device ID, docking station key, and optional driver image. Upon reception of a driver identification success message from the user device, the TU enables the user history tracking process 1124.

Upon receiving a driver identification failure status message from the user device, the TU sends a driver identification failure message to the remote server via cloud connectivity 1126. The driver identification failure message to the remote server may contain the TU ID, user ID, user device ID, docking station key, and the frontal face image. Upon reception of a driver identification failure status message from the user device, the TU disables the user history tracking process 1128.

Figure 12:
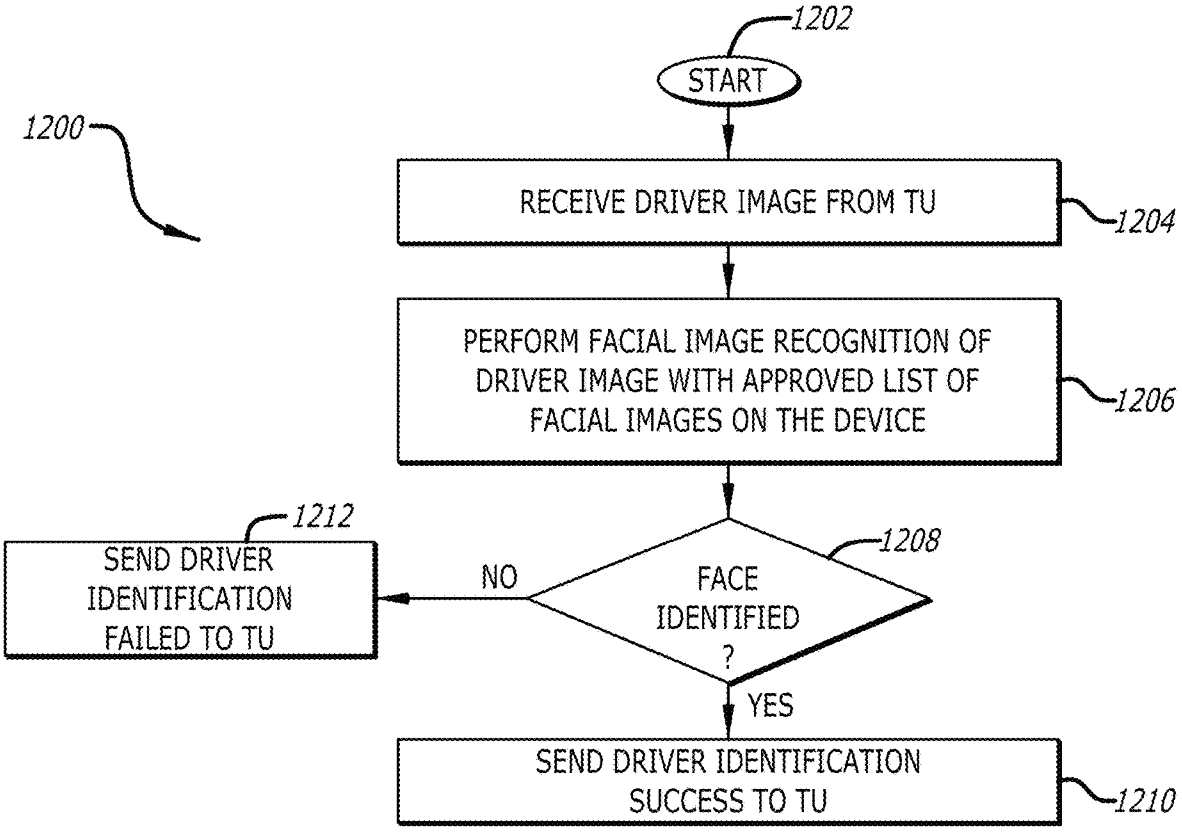
FIG. 12 is a flow diagram illustrating the driver identification user device flow.

FIG. 12 is a flow diagram illustrating the driver identification user device flow 1200. Successful completion of system pairing enables the driver identification process 1202. The user device, while still in the docking station and connected to the TU, waits for a driver identification request message from the TU via SRCC 1204. The message is sent via SRCC to ensure the user device is still on the docking station. The user device is configured with user IDs and corresponding driver front face images. Each user device may support multiple users. Once the user ID is authenticated successfully by the remote server during the user device login validation process, the corresponding user image is decrypted and loaded into memory for identity validation.

The user device receives a driver identification request from the connected TU via SRCC with the user image and user ID. It then compares the user ID provided by the TU with the current authenticated user ID. If the user IDs are identical, the user device performs facial image recognition of the TU supplied user image with the user image in stored in memory 1206 to determine if the facial image has been identified 1208. Upon successful comparison of the user ID and facial image, the user device sends a driver identification success message to the TU via SRCC 1210 and enables user history tracking process with relevant data (user ID, user device ID, TU ID, optional image, identification status). Upon unsuccessful comparison of the user ID and facial image, the user device sends a driver identification failure message to the TU via SRCC and disables user history tracking process 1212.

Figure 13:
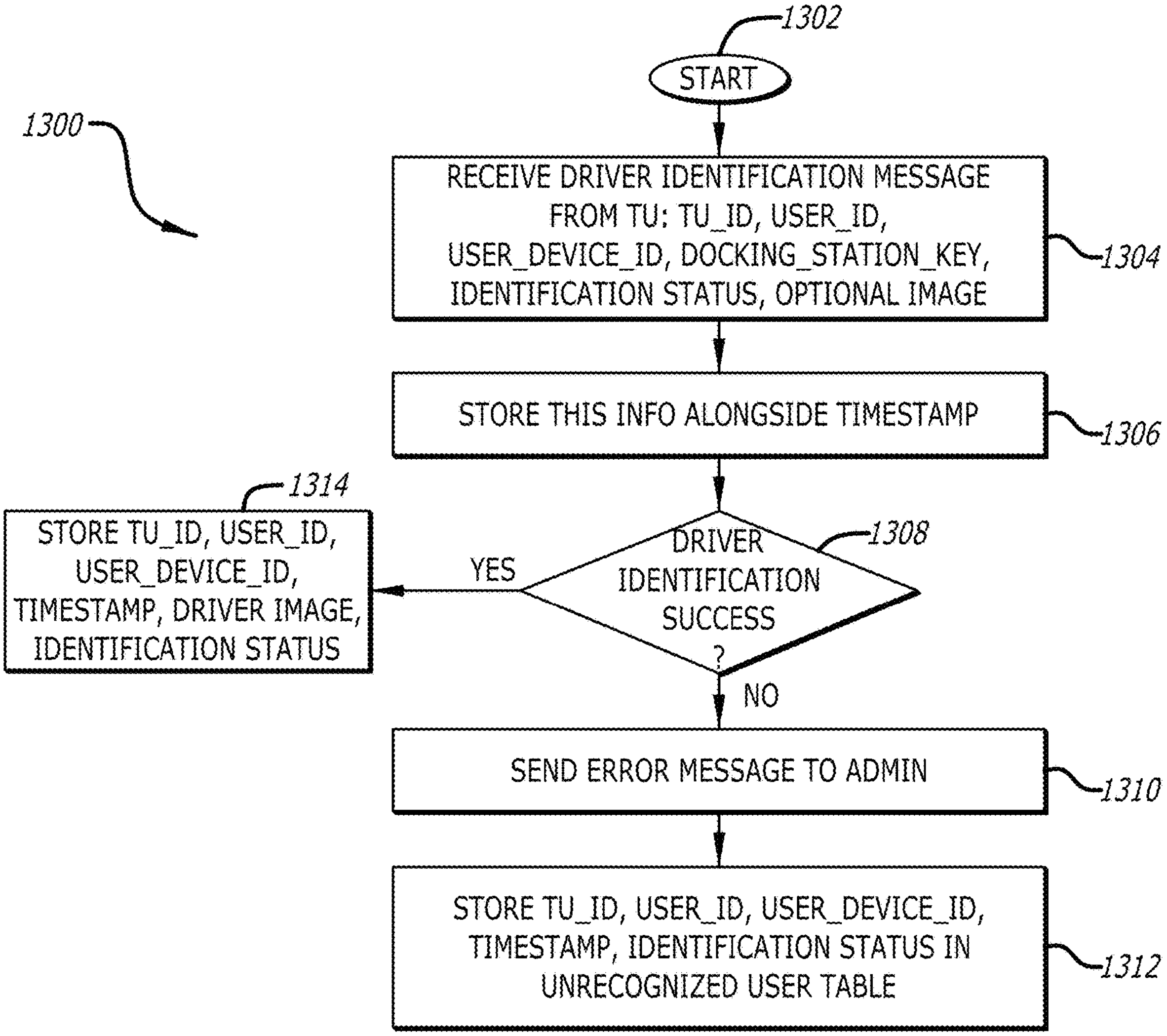
FIG. 13 is a flow diagram illustrating the driver identification remote server flow.

FIG. 13 is a flow diagram illustrating the driver identification remote server flow 1300. In an unsuccessful automated driver identification process, the remote server may send the administrator a manual review request message. The administrator may review the user image and update the user device with additional images of the user for better image recognition. The remote server also updates the database with the identification status for logging purpose 1302. The remote server receives a driver identification status message from the TU via cloud connectivity. The message contains the TU ID, user ID, user device ID, docking station key, validation status, and optionally the user image. In the event of unsuccessful validation, the image is mandatory 1304. The remote server then stores the received TU ID, user ID, user device ID, docking station key, timestamp and the identification status, and optional user image to the database 1306.

Next, a determination is made as to whether the driver identification was successful 1308. In the event of unsuccessful driver identification, the remote server sends an error message to an administrator for further review 1310 and stores the TU ID, user ID, user device ID, timestamp, and identification status in an unrecognized user table 1312. In the event of successful driver identification, the remote server stores the TU ID, user ID, user device ID, timestamp, and identification status in the database 1314.

Figure 14:
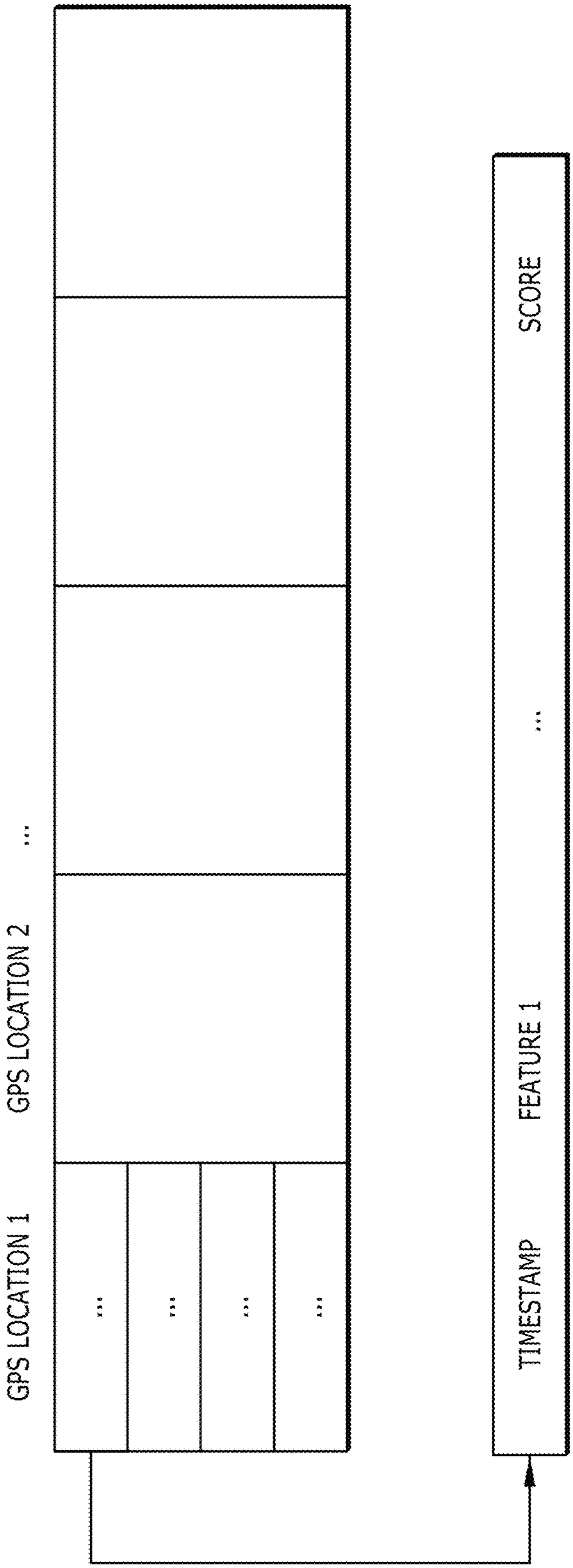
FIG. 14 illustrates the historic driver data formatted as a data structure for each user identification (ID).

FIG. 14 illustrates the historic driver data formatted as a data structure for each user ID, indexed by GPS location and time. Each GPS location may contain, but is not limited to, a collection of timestamps, driver behavior rates, and driver scores.

Figure 15A:
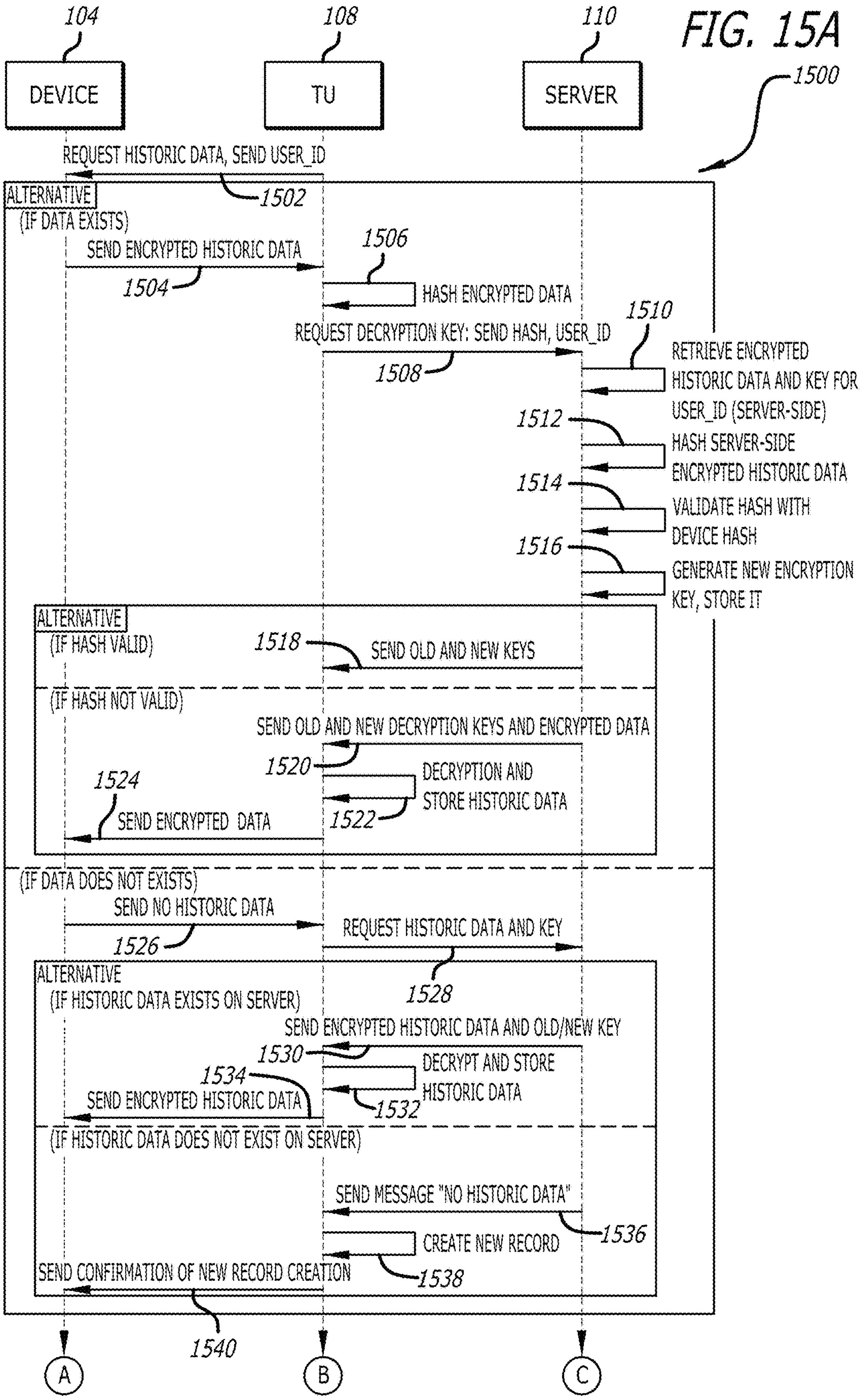
FIGS. 15A-15B are a flow diagram illustrating the historic driver data retrieval sequence.
Figure 15B:
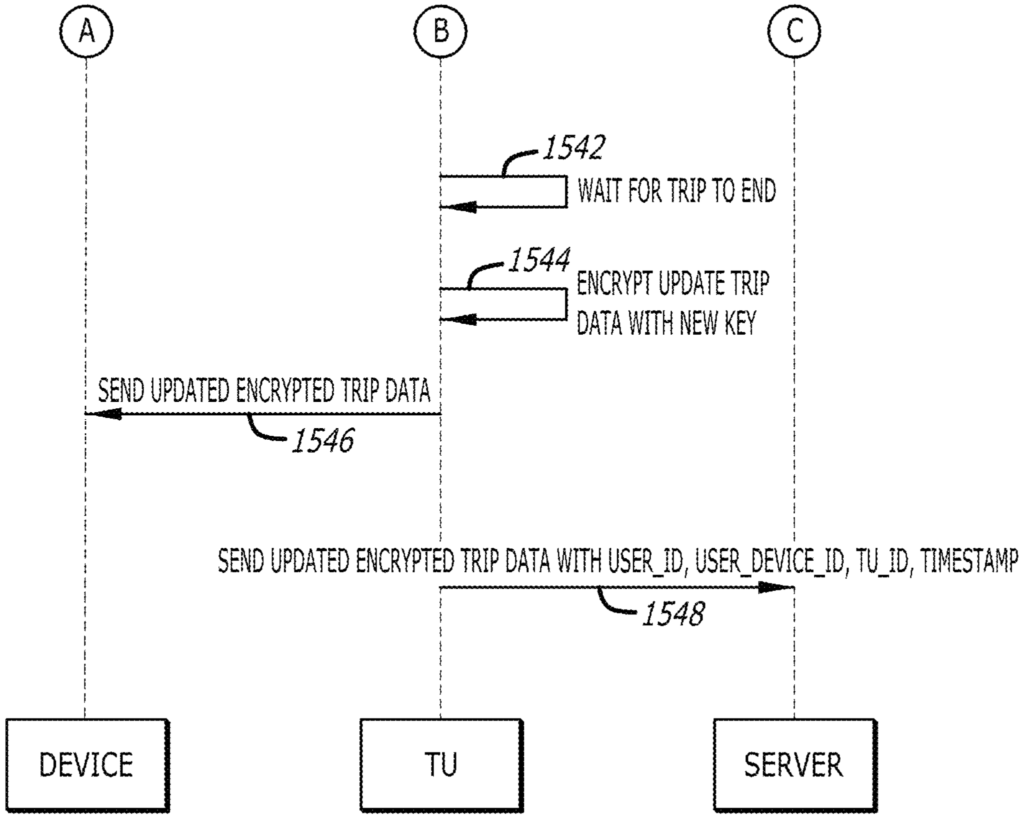

FIGS. 15A and 15B are a flow diagram illustrating the historic driver data retrieval sequence 1500. The historic driver data retrieval sequence only occurs after a secure connection between all three devices (user device 104, TU 108, and server 110) is established, so data can be transferred safely. This sequence tries to minimize data transfer between the user device/TU and the remote server by keeping encrypted historic driver data on the user device and keeping the encryption key on the remote server. The user device and the remote server each maintain an updated copy of the historical driver data minimizing data transfer between the two reducing the need for transferring data using the cloud and consequently, saving money and reducing data transfer. By doing this, only the server is required to communicate the key unless the data on the user device is incorrect.

First, the TU requests data from the user device by sending the user ID of the data it requires 1502. The user device then checks if the data exists on the user device. If the data does exist on the user device, the user device sends its encrypted historic driver data to the TU 1504. Raw data is never sent. To verify the user device sent correct and up to date data, the TU applies a hashing algorithm 1506 on the encrypted data and sends the hash to the remote server 1508. The remote server then retrieves the encrypted historic driver data and key for the user ID from its data base 1510 and applies the same hashing algorithm on its own copy of the encrypted data 1512 and compares the two hashes 1514.

The remote server generates a new encryption key and stores it in the database/memory 1516. If the hashes are the same, the data that the user device sent to the TU was up to date and the remote server sends the old and new encryption keys (or first and second symmetric keys) back to the TU 1518. The TU can then decrypt and store the historic driver data.

If the hashes are different, the data the user device contained was different and the remote server sends the encrypted data along with the old and new encryption keys (or first and second symmetric keys) back to the TU 1520. The TU then decrypts and stores the historic driver data 1522 and sends the encrypted data back to the user device 1524. The user device can now store up to date encrypted data.

If the data does not exist on the user device, the user device sends a message to the TU indicating that there is no historic driver data on the user device 1526. The TU then requests the historic driver data and symmetric key from the remote server 1528, so the remote server must check if there exists historic driver data for that user ID.

If historic driver data exists on the remote server, the remote server sends encrypted data along with the symmetric key back to the TU 1530. The TU then decrypts the data and stores it 1532 and sends the encrypted data back to the user device 1534. The user device then stores the up-to-date encrypted data.

If historic driver data does not exist on the remote server, the remote server sends a message (i.e. no historic data message) to the TU indicating no historic driver data, as this is a new user with no historic driver data present 1536. The TU then creates a new record in its database 1538 and sends a confirmation of the new record creation to the user device 1540.

Next, the TU waits for the trip to end 1542, encrypts updated trip data with the new symmetric key 1544, and sends the updated encrypted trip data to the user device 1546. Next, the TU sends the updated encrypted trip data with user ID, user device ID, TU ID, and timestamp to the remote server 1548.

Figure 16:
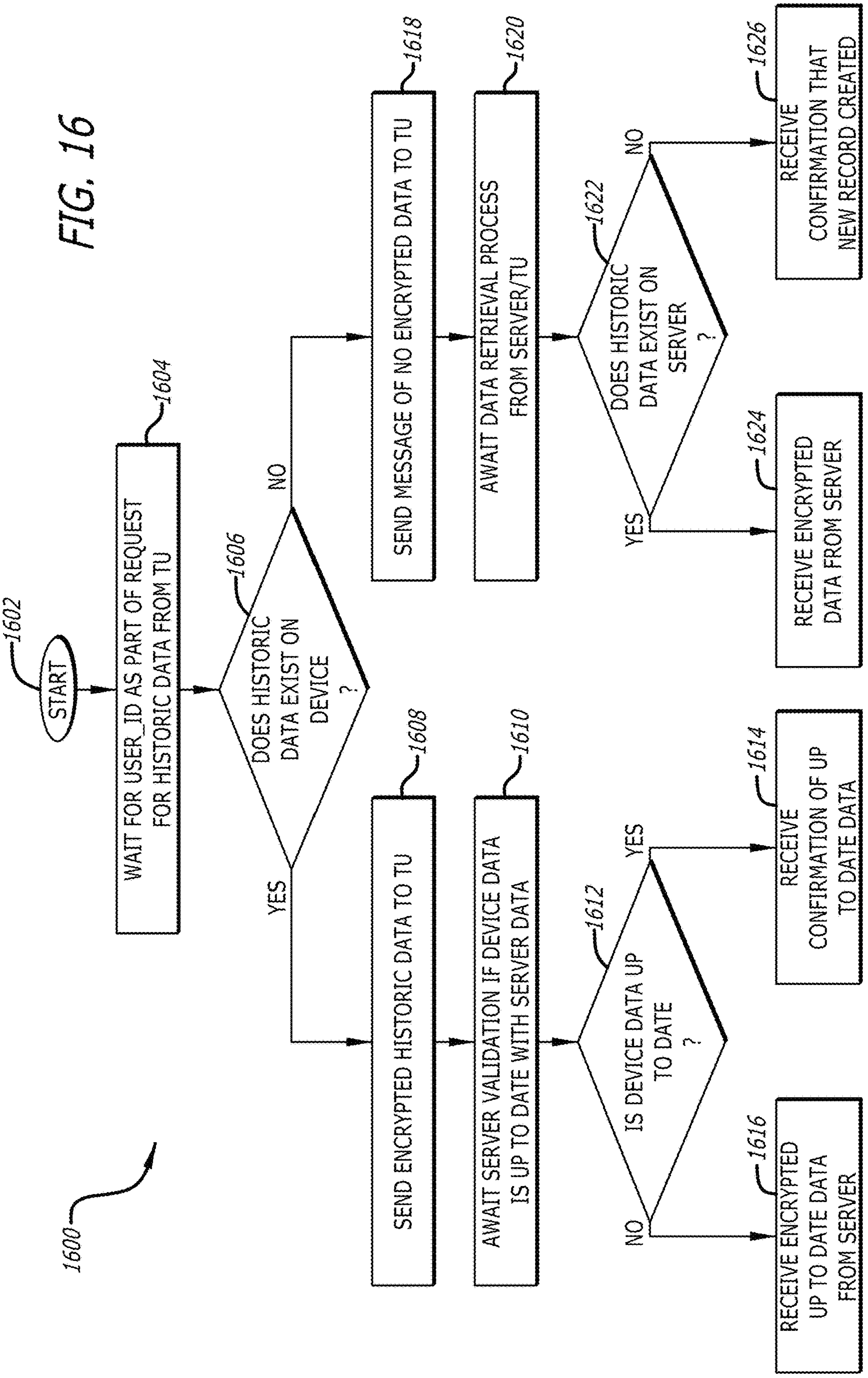
FIG. 16 is a flow diagram illustrating the historic driver data retrieval user device flow.

FIG. 16 is a flow diagram illustrating the historic driver data retrieval user device flow 1600. The user device starts 1602 by waiting for the request for historic driver data which it will send based on the user ID it receives 1604. The communication is via SRCC to ensure the user device is on the docking station. Next, a determination is made if the historic driver data for that specific user ID exists on the user device 1606. If historic driver data does exist on the user device, the user device sends the encrypted data to the TU 1608 and awaits a remote server validation message indicating if the data is up to date 1610. Next, a determination is made as to whether the user data is up to date 1612. If the user data is up to date, the user device receives confirmation that the data is up to date and the user device does not need to perform any more actions 1614. If the user device data is not up to date, the user device receives the encrypted up-to-date data from the the remote server, via the TU, and then writes this new data to storage/memory on the TU 1616.

If historic driver data does not exist on the user device, the user device sends a message of no encrypted data to the TU 1618 and then awaits the data retrieval process from the remote server/TU 1620. Next, a determination is made as to whether the historic driver data exists on the remote server 1622. If historic driver data exists on the remote server, the user device receives the encrypted up-to-date data from the remote server, via the TU 1624, and then writes this new data to storage/memory. If historic driver data does not exist on the remote server, the user device receives confirmation that a new record was created since there was no prior historic driver data 1626.

Figure 17A:
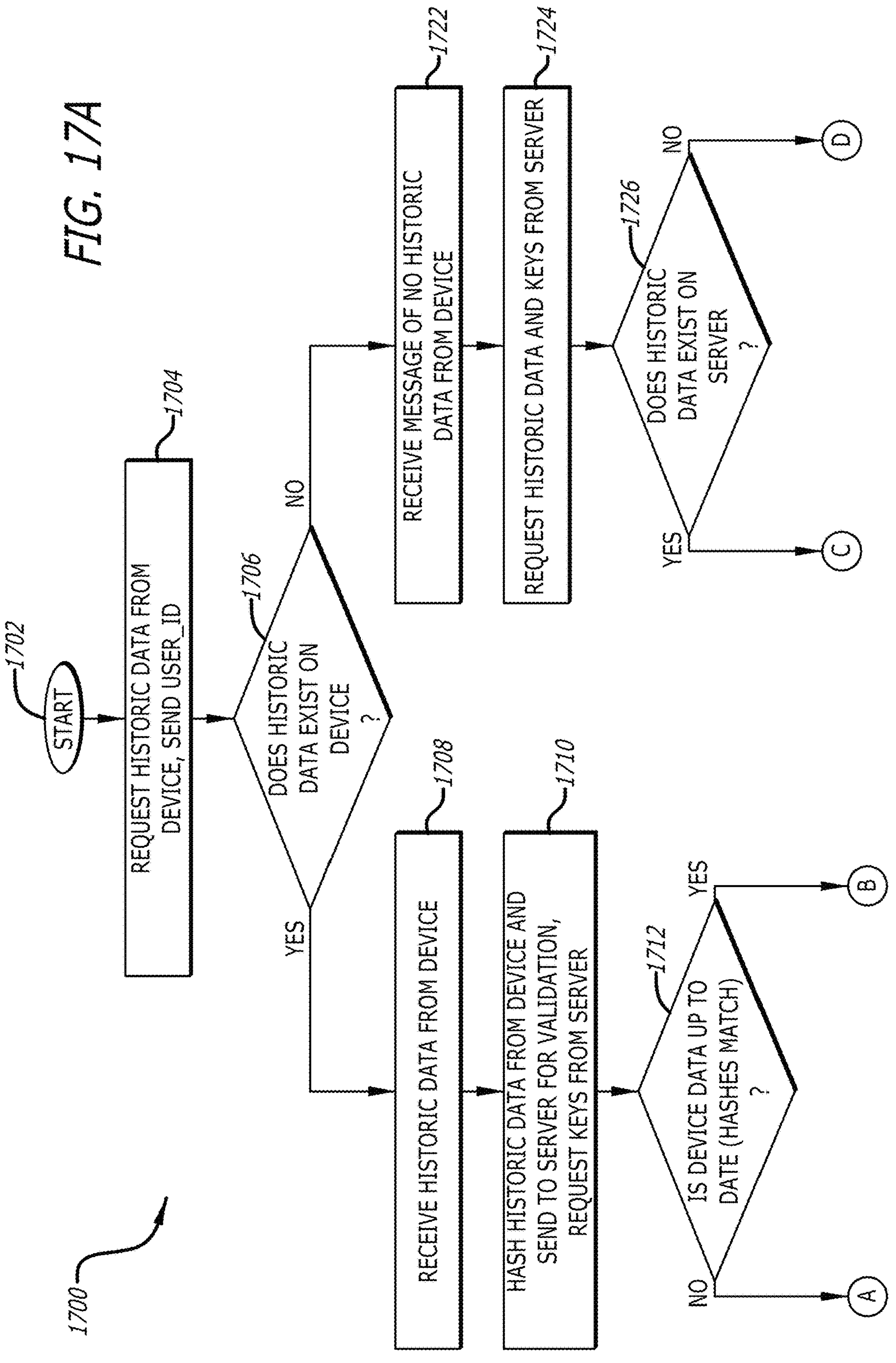
FIGS. 17A-17B is a flow diagram illustrating the historic driver data retrieval TU flow.
Figure 17B:
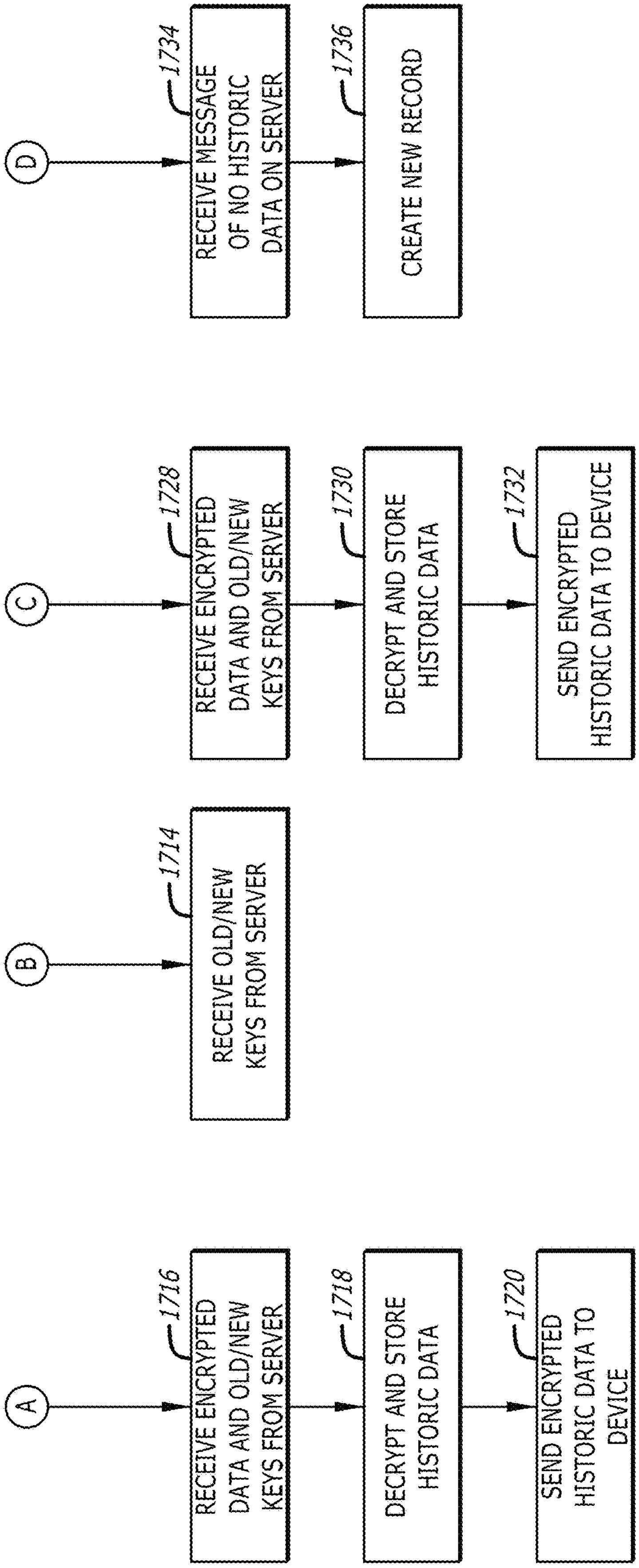

FIGS. 17A-17B are a flow diagram illustrating the historic driver data retrieval TU flow 1700. The TU starts 1702 by requesting the encrypted historic driver data from the user device by sending the user ID of the driver 1704 to the user device. The user device then checks if historic driver data exists for that driver on the user device 1706. If historic driver data does exist on the user device, the TU receives the historic driver data from the user device 1708. It then hashes this data and sends the hashed data to the remote server for validation (i.e., check if historic driver data is up to date) and requests the old/new keys (first and second symmetric keys) from the server 1710.

Next, a determination is made as to whether the user device data is up to date, i.e., if the hashes match 1712. If the hashes match and the user device data was up to date, the TU receives the old and new keys (first and second symmetric keys) from the remote server and is able to decrypt and store the historic driver data using the old key (first symmetric key) 1714. If the hashes do not match and the user device data was incorrect, the TU receives the old/new keys (or first and second symmetric keys) along with the up-to-date historic driver data from the remote server 1716. The TU then decrypts and stores the historic driver data using the old key (first symmetric key) 1718 and sends the encrypted data to the user device 1720.

If historic driver data does not exist on the user device, the TU receives a message from the user device that there is no historic driver data 1722. The TU then requests the historic driver data and the old/new keys (first and second symmetric keys) from the remote server 1724. The remote server then checks if historic driver data exists on the remote server 1726. If historic driver data exists on the remote server, the TU receives the encrypted data and old/new keys (first and second symmetric keys) from the remote server 1728. The TU then decrypts the historic driver data using the old key (first symmetric key), stores it 1730, and sends the encrypted data to the user device 1732.

If historic driver data does not exist on the remote server, the TU receives a message that no historic driver data exists on the remote server either 1734. The TU then creates a new record in its database for a new user and sends a confirmation to the user device of a new user 1736.

Figure 18:
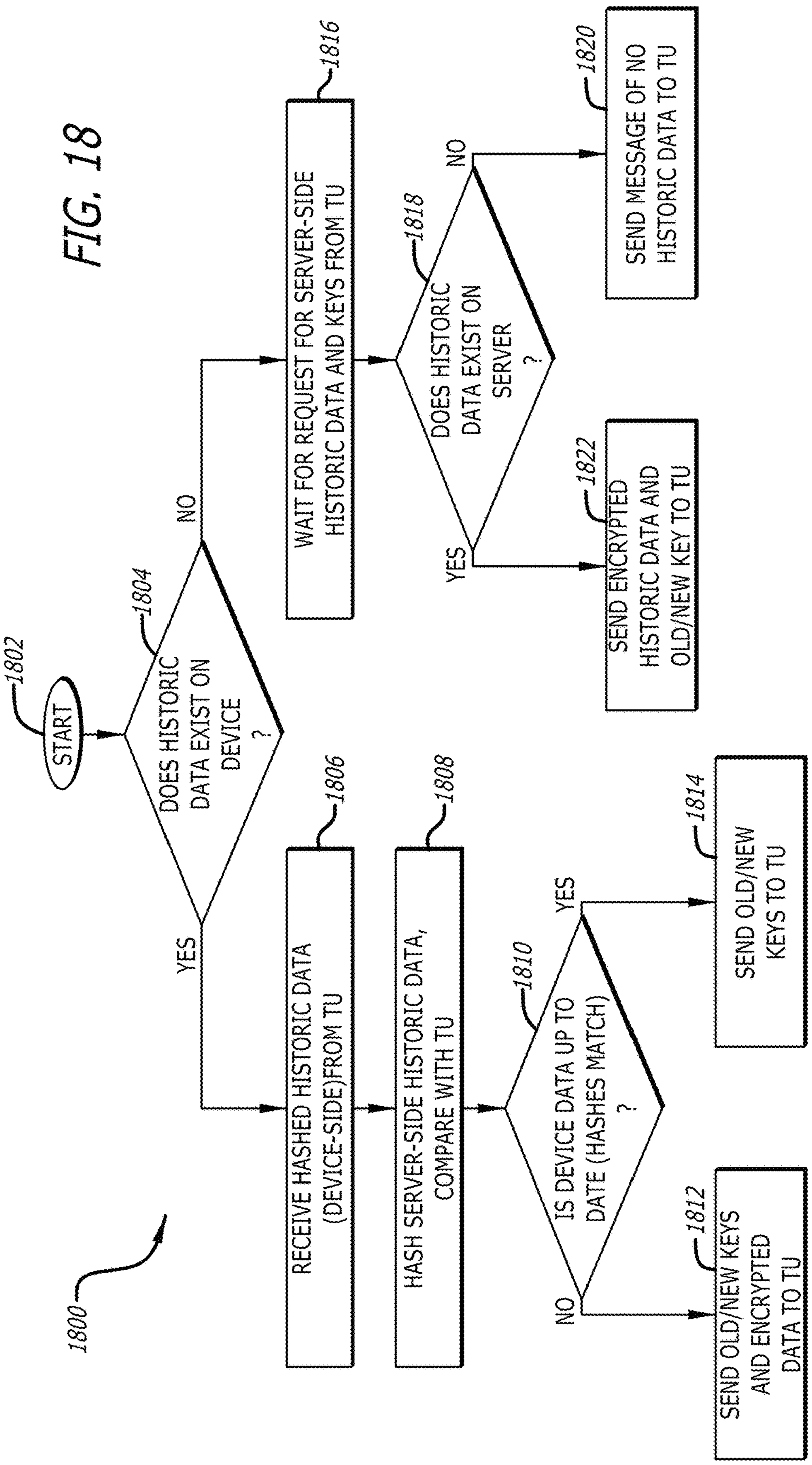
FIG. 18 is a flow diagram illustrating the historic driver data retrieval server flow.

FIG. 18 is a flow diagram illustrating the historic driver data retrieval remote server flow 1800. The remote server waits to hear a message from the TU, which can be different depending on other decisions that happen in the sequence (data on the user device or not) 1802. A determination is made as to whether historic driver data exists on the user device 1804. If historic driver data exists on the user device, the remote server receives a hash of the encrypted historic driver data on the device side (i.e. the user device driver historic data) from the TU 1806. It then uses the same hashing algorithm on its own encrypted historic driver data and compares the two 1808. Next, a determination is made as to whether the user device historic driver data is up to date, i.e., the hashes match 1810. If the hashes are the same, i.e., match, the user device historic data is up-to-date and correct and the remote server sends the old/new keys (first and second symmetric keys) to the TU for the TU to decrypt the historic driver data 1812. If the hashes are different, the user device data is incorrect and the remote server sends both the old/new keys and the encrypted data to the TU 1814.

If historic driver data does not exist on the user device, the remote server waits for a request for server-side historic driver data and keys from the TU 1816. Next, a determination is made as to whether the historic driver data exists on the remote server 1818. If historic driver data does not exist on the remote server, the remote server sends a message saying that no historic driver data exists on the remote server either 1820. The remote server then checks if it has historic driver data for the user ID.

If historic driver data exists on the remote server, the remote server sends both the old/new keys (first and second symmetric keys) and the encrypted data to the TU 1822. After data retrieval and a trip is completed, the TU encrypts the new data with a new key (second symmetric key) generated by the remote server. The TU sends this new data to the user device and sends the new encrypted data alongside relevant information (user ID, user device ID, TU ID, timestamp) to the remote server.

Figure 19:
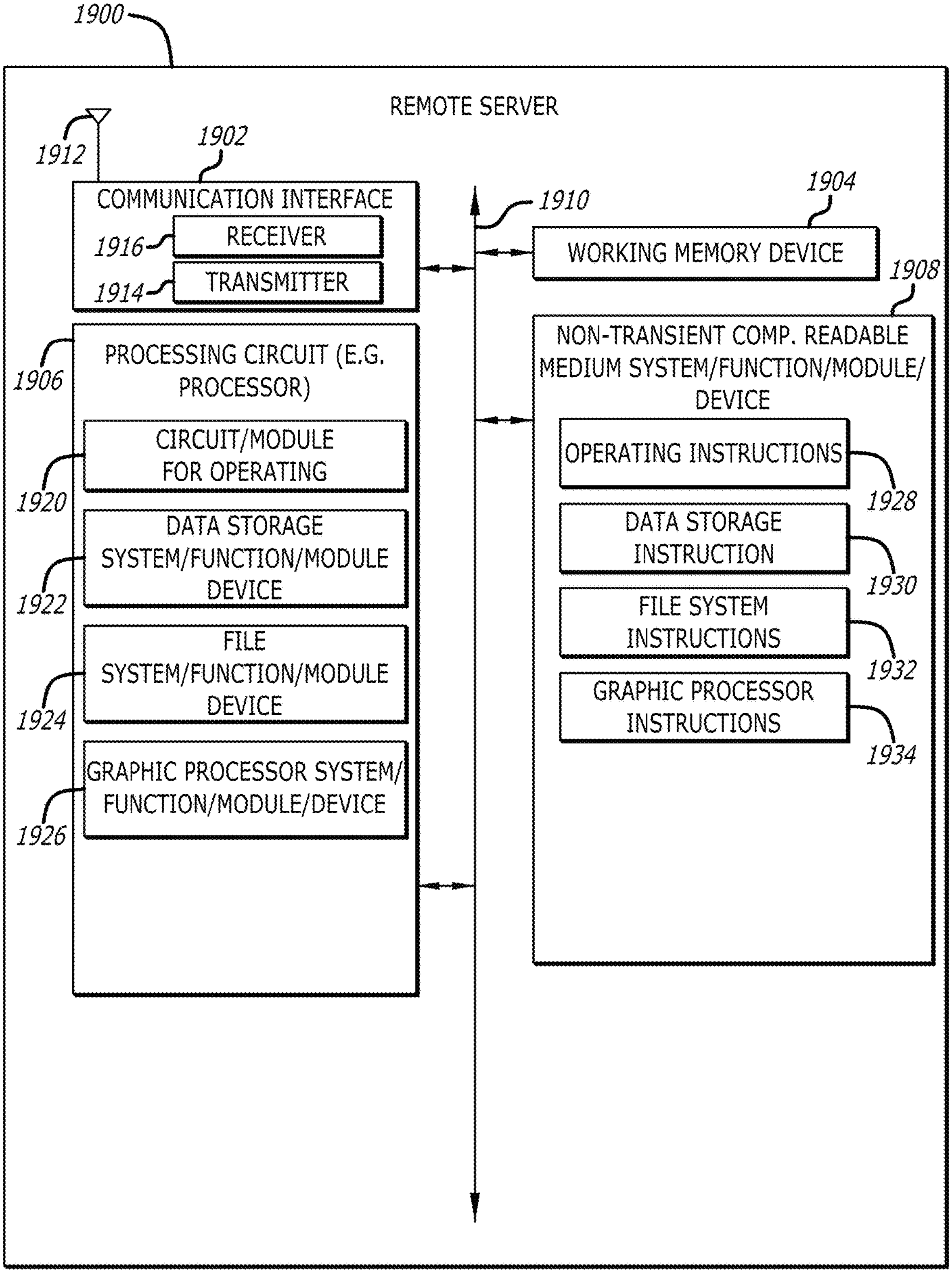
FIG. 19 illustrates a block diagram of an example hardware implementation of a server module/apparatus configured to communicate according to one or more aspects of the disclosure.

FIG. 19 illustrates a block diagram of an example hardware implementation of a remote server module/apparatus 1900 configured to communicate according to one or more aspects of the disclosure. The remote server 1900 may include, for example, a communication interface 1902. The communication interface 1902 may enable data and control input and output. The communication interface 1902 may, for example, enable communication over one or more communication networks, similar to communication network(s) 102 of FIG. 1. The communication interface 1902 may be communicatively coupled, directly or indirectly, to the communication network(s) 102. The server 1900 may include a working memory device 1904, and a processor system/function/module/device (hereinafter the processor 1906). The processor 1906 may use the working memory device 1904 to store data that is about to be operated on, being operated on, or was recently operated on. The processor 1906 may store instructions on the working memory device 1904 and/or on one or more other memory structures or devices, such as, for example, non-transitory computer readable medium system/function/module/device (hereinafter the non-transitory computer readable medium 1908). When executed by the processor 1906, the instructions may cause the processor 1906 to perform, for example, one or more aspects of the methods described herein.

The remote server 1900 may be implemented with a bus architecture, represented generally by the bus 1910. The bus 1910 may include any number of interconnecting buses and bridges depending on the specific application of the server 1900 and overall design constraints. The bus 1910 may communicatively couple various circuits including one or more processors (represented generally by the processor 1906), the working memory device 1904, the communication interface 1902, and the non-transitory computer readable medium 1908. The bus 1910 may also link various other circuits and devices, such as timing sources, peripherals, voltage regulators, and power management circuits and devices, which are well known in the art, and therefore, are not described any further.

The communication interface 1902 provides a means for communicating with other apparatuses over a transmission medium. In some implementations, the communication interface 1902 includes circuitry and/or programming adapted to facilitate the communication of information bi-directionally with respect to one or more communication devices in a network. In some implementations, the communication interface 1902 is adapted to facilitate wireless communication of the server 1900. In these implementations, the communication interface 1902 may be coupled to one or more antennas 1912 as shown in FIG. 19 for wireless communication within a wireless communication system. In some implementations, the communication interface 1902 may be configured for wire-based communication. For example, the communication interface 1902 could be a bus interface, a send/receive interface, or some other type of signal interface including drivers, buffers, or other circuitry for outputting and/or obtaining signals (e.g., outputting signal from and/or receiving signals into an integrated circuit). The communication interface 1902 can be configured with one or more standalone receivers and/or transmitters, as well as one or more transceivers. In the illustrated example, the communication interface 1902 includes a transmitter 1914 and a receiver 1916. The communication interface 1902 serves as one example of a means for receiving and/or means transmitting.

The processor 1906 may be responsible for managing the bus 1910 and general processing, including the execution of software stored on the non-transitory computer readable medium 1908. The software, when executed by the processor 1906, may cause the processor 1906 to perform the various functions described below for any particular apparatus or module. The non-transitory computer readable medium 1908 and the working memory device 1904 may also be used for storing data that is manipulated by the processor 1906 when executing software.

One or more processors, such as processor 1906 in the server 1900 may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer readable medium, such as non-transitory computer readable medium 1908. Non-transitory computer readable medium 1908 may include, by way of example, a magnetic storage device (e.g., hard disk, floppy disk, magnetic tape, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable non-transitory medium for storing software, date, and/or instructions that may be accessed and read by a computer or the processor 1906. Computer readable media may also include, by way of example, a carrier wave, a transmission line, and any other suitable medium for transmitting software and/or instructions that may be accessed and read by a computer or the processor 1906.

The processor 1906 is arranged to obtain, process and/or send data, control data access and storage, issue commands, and control other desired operations. The processor 1906 may include circuitry configured to implement desired programming provided by appropriate media in at least one example.

The non-transitory computer readable medium 1908 may be embodied in a computer program product. By way of example, a computer program product may include a computer readable medium in packaging materials. Those skilled in the art will recognize how best to implement the described functionality presented throughout this disclosure depending on the particular application and the overall design constraints imposed on the overall system.

In some aspects of the disclosure, the processor 1906 may include circuitry configured for various functions. For example, the processor 1906 may include a circuit/module for operating 1920 and configured to manage operation of historic driver data received from the user device 104 (FIG. 1) and the Telematics Unit 108 (FIG. 1) and to perform input/output operations associated with access to the Internet web and perform, for example, methods described herein. For example, the processor 1906 may include a data storage 1922 system/function/module/device configured to store data including data including but not limited to images, sensory data, event data, threshold levels, video data, driver data, score data and previously collected data sets. For example, the processor 1906 may include a file system/function/module/device 1924 configured to control how data in local data storage and/or remote data storage is stored and retrieved. For example, the processor 1906 may include a Graphic Processor system/function/module/device 1926 configured to control video input and output on cameras onboard the vehicle.

In some aspects of the disclosure, the non-transitory computer readable medium 1908 of the remote server 1900 may include instructions that may cause the various systems/functions/modules/devices of the processor 1906 to perform the methods described herein. For example, the non-transitory computer readable medium 1908 may include operating instructions or code 1928 to the circuit/module for operating 1920. For example, the non-transitory computer readable medium 1908 may include data storage instructions 1930 corresponding to the data storage system/function/module/device 1922. For example, the non-transitory computer readable medium 1908 may include file system instructions 1932 corresponding to the file system/function/module/device 1924. For example, the non-transitory computer readable medium 1908 may include graphic processor instructions 1934 corresponding to the graphic processor system/function/module/device 1926.

Figure 20:
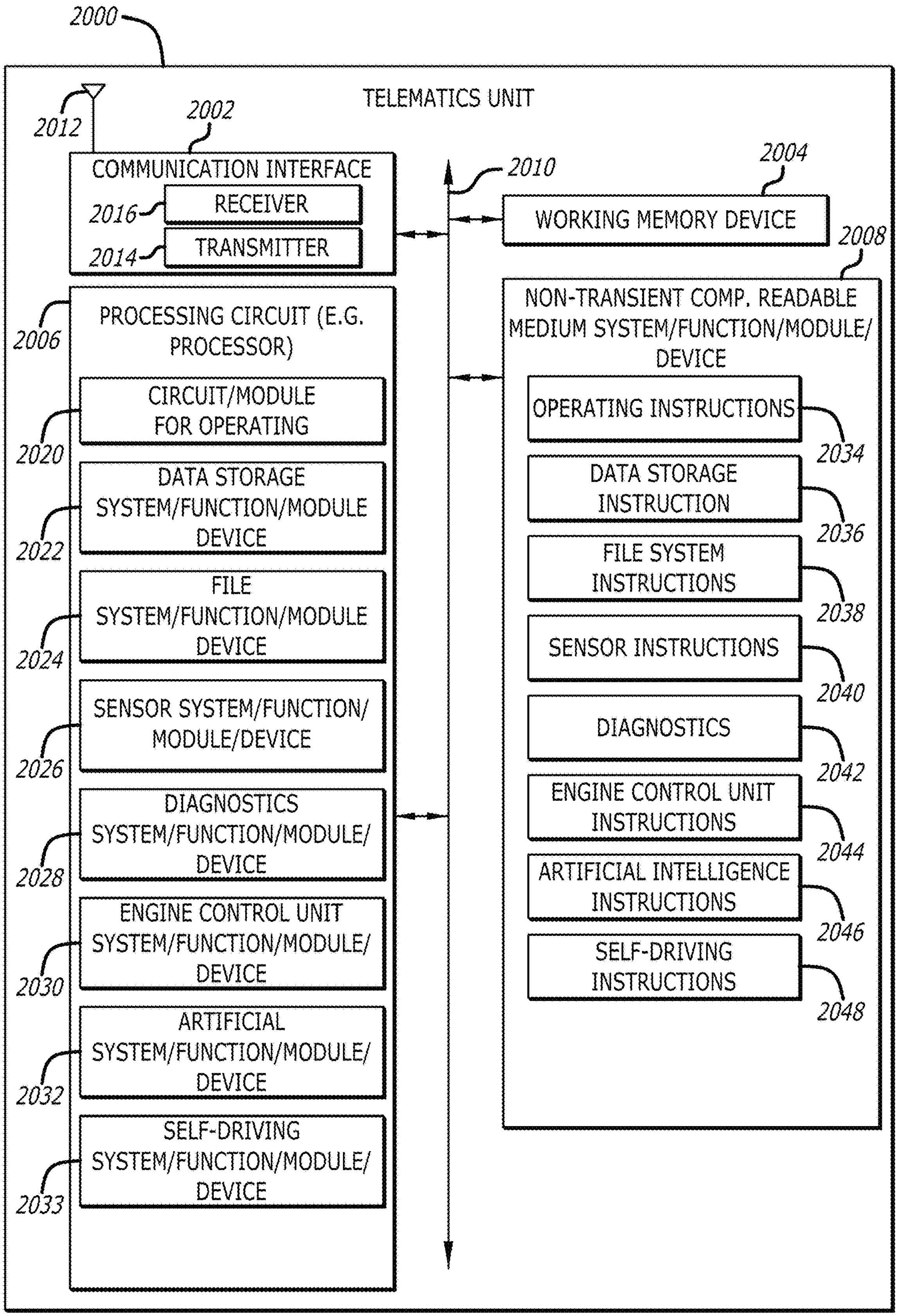
FIG. 20 illustrates a block diagram of an example hardware implementation of a telematics unit configured to communicate according to one or more aspects of the disclosure.

FIG. 20 illustrates a block diagram of an example hardware implementation of a telematics unit 2000 configured to communicate according to one or more aspects of the disclosure. The telematics unit 2000 may include, for example, a communication interface 2002. The communication interface 2002 may enable data and control input and output. The communication interface 2002 may, for example, enable communication over one or more communication networks, similar to communication network(s) 102 of FIG. 1. The communication interface 2002 may be communicatively coupled, directly or indirectly, to the communication network(s) 102. The telematic unit 2000 may include a local working memory device 2004, and a processor system/function/module/device (hereinafter the processor 2006). The processor 2006 may use the working memory device 2004 to store data that is about to be operated on, being operated on, or was recently operated on. The processor 2006 may store instructions on the working memory device 2004 and/or on one or more other memory structures or devices, such as, for example, non-transitory computer readable medium system/function/module/device (hereinafter the non-transitory computer readable medium 2008). When executed by the processor 2006, the instructions may cause the processor 2006 to perform, for example, one or more aspects of the methods described herein.

The telematics unit 2000 may be implemented with a bus architecture, represented generally by the bus 2010. The bus 2010 may include any number of interconnecting buses and bridges depending on the specific application of the telematics unit 2000 and overall design constraints. The bus 2010 may communicatively couple various circuits including one or more processors (represented generally by the processor 2006), the working memory device 2004, the communication interface 2002, and the non-transitory computer readable medium 2008. The bus 2010 may also link various other circuits and devices, such as timing sources, peripherals, voltage regulators, and power management circuits and devices, which are well known in the art, and therefore, are not described any further.

The communication interface 2002 provides a means for communicating with other apparatuses over a transmission medium. In some implementations, the communication interface 2002 includes circuitry and/or programming adapted to facilitate the communication of information bi-directionally with respect to one or more communication devices in a network. In some implementations, the communication interface 2002 is adapted to facilitate wireless communication of the telematics unit 2000. In these implementations, the communication interface 2002 may be coupled to one or more antennas 2012 as shown in FIG. 20 for wireless communication within a wireless communication system. In some implementations, the communication interface 2002 may be configured for wire-based communication. For example, the communication interface 2002 could be a bus interface, a send/receive interface, or some other type of signal interface including drivers, buffers, or other circuitry for outputting and/or obtaining signals (e.g., outputting signal from and/or receiving signals into an integrated circuit). The communication interface 2002 can be configured with one or more standalone receivers and/or transmitters, as well as one or more transceivers. In the illustrated example, the communication interface 2002 includes a transmitter 2014 and a receiver 2016. The communication interface 2002 serves as one example of a means for receiving and/or means transmitting.

The processor 2006 may be responsible for managing the bus 2010 and general processing, including the execution of software stored on the non-transitory computer readable medium 2008. The software, when executed by the processor 2006, may cause the processor 2006 to perform the various functions described below for any particular apparatus or module. The non-transitory computer readable medium 2008 and the working memory device 2004 may also be used for storing data that is manipulated by the processor 2006 when executing software.

One or more processors, such as processor 2006 in the telematics unit 2000 may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer readable medium, such as non-transitory computer readable medium 2008. Non-transitory computer readable medium 2008 may include, by way of example, a magnetic storage device (e.g., hard disk, floppy disk, magnetic tape, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable non-transitory medium for storing software, date, and/or instructions that may be accessed and read by a computer or the processor 2006. Computer readable media may also include, by way of example, a carrier wave, a transmission line, and any other suitable medium for transmitting software and/or instructions that may be accessed and read by a computer or the processor 2006.

The processor 2006 is arranged to obtain, process and/or send data, control data access and storage, issue commands, and control other desired operations. The processor 2006 may include circuitry configured to implement desired programming provided by appropriate media in at least one example.

The non-transitory computer readable medium 2008 may be embodied in a computer program product. By way of example, a computer program product may include a computer readable medium in packaging materials. Those skilled in the art will recognize how best to implement the described functionality presented throughout this disclosure depending on the particular application and the overall design constraints imposed on the overall system.

In some aspects of the disclosure, the processor 2006 may include circuitry configured for various functions. For example, the processor 2006 may include a circuit/module for operating 2020 and configured to manage operation of the sensors and display and to perform input/output operations associated with access to the Internet web and perform, for example, methods described herein. For example, the processor 2006 may include a data storage 2022 system/function/module/device configured to store data including data including but not limited to images, sensory data, event data, threshold levels, video data, driver data, score data and previously collected data sets. For example, the processor 2006 may include a file system/function/module/device 2024 configured to control how data is stored and retrieved. For example, the processor 2006 may include an in-vehicle sensor system/function/module/device 2026 mounted in a vehicle configured to control sensor input and video input. For example, the processor 2006 may include a diagnostics a system/function/module/device 2026 configured to serve, for example, email accounts and process email messages and bundle emails for transmission to retrieve and store a vehicle's self-reported data, recorded video, and to perform, for example, methods described herein. For example, the processor 2006 may include an engine control unit system/function/module/device 2030 configured to control one or more electrical systems of subsystems in a vehicle to external remote servers, and to perform, for example, methods described herein. For example, the processor 2006 may include an artificial intelligence system/function/module/device 2032 configured to build a model of prior usage. For example, the processor 2006 may include self-driving system/function/module/device 2032 configured to determine if the self-driving system of the car was engaged at the time of the risky event and whether the driver engaged the self-driving system or the vehicle engaged the self-driving feature.

In some aspects of the disclosure, the non-transitory computer readable medium 2008 of the telematics unit 2000 may include instructions that may cause the various systems/functions/modules/devices of the processor 2006 to perform the methods described herein. For example, the non-transitory computer readable medium 2008 may include operating instructions or code 2020 to the circuit/module for operating 2020. For example, the non-transitory computer readable medium 2008 may include data storage instructions 2036 corresponding to the data storage system/function/module/device 2022. For example, the non-transitory computer readable medium 2008 may include file system instructions 2038 corresponding to the file system/function/module/device 2024. For example, the non-transitory computer readable medium 2008 may include sensor instructions 2040 corresponding to the in-vehicle sensor system/function/module/device 2026 mounted in a vehicle. For example, the non-transitory computer readable medium 2008 may include diagnostic instructions 2042 corresponding to the engine control unit system/function/module/device 2030. For example, the non-transitory computer readable medium 2008 may include engine control unit instructions 2044 corresponding to the engine control unit system/function/module/device 2030. For example, the non-transitory computer readable medium 2008 may include artificial intelligence instructions 2046 corresponding to the artificial intelligence system/function/module/device 2032. For example, the non-transitory computer readable medium 2008 may include self-driving instructions 2046 corresponding to the self-driving system/function/module/device 2033.

Figure 21:
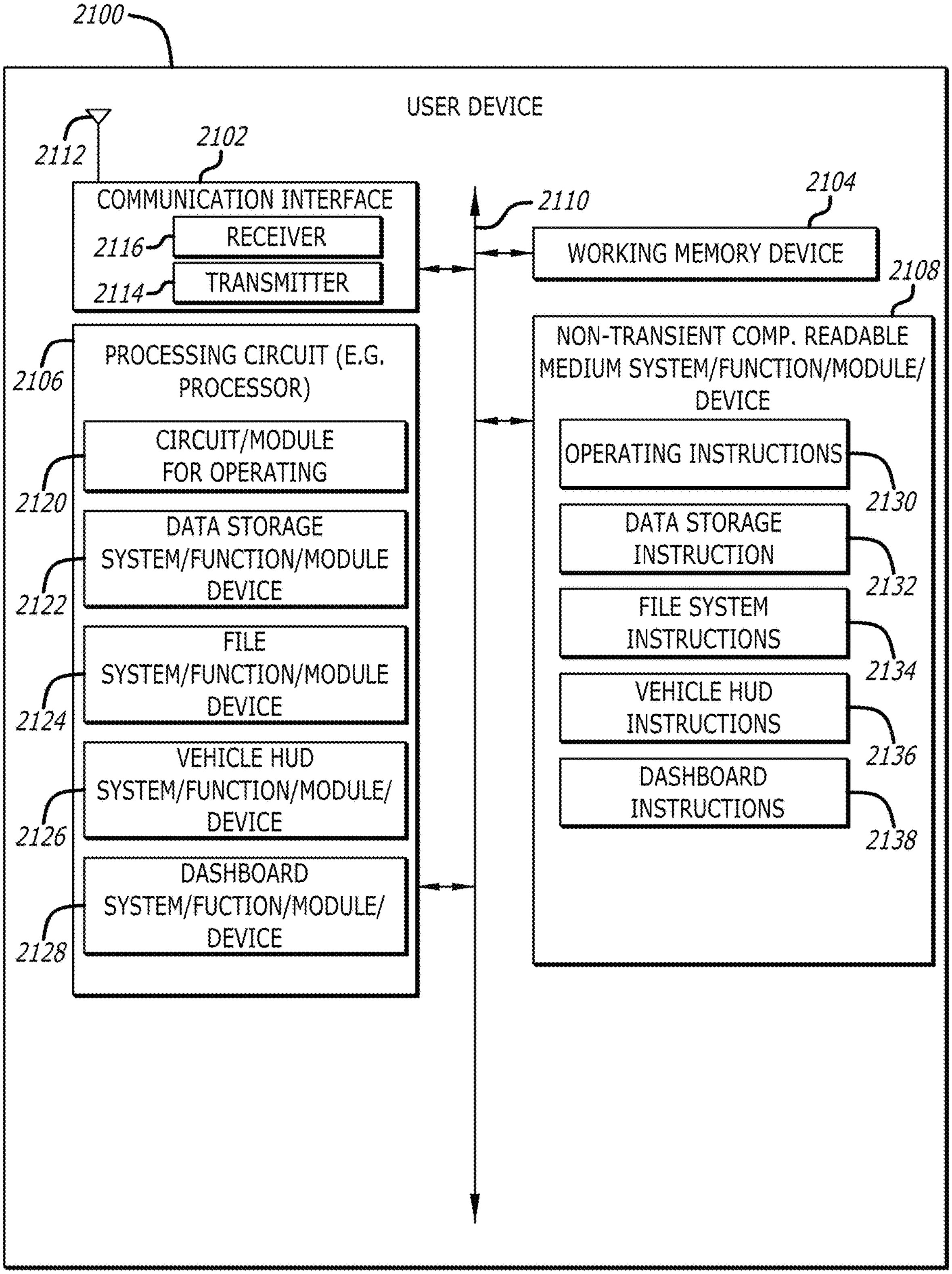
FIG. 21 illustrates a block diagram of an example hardware implementation of a user device configured to communicate according to one or more aspects of the disclosure.

FIG. 21 illustrates a block diagram of an example hardware implementation of a user device 2100 configured to communicate according to one or more aspects of the disclosure. The user device 2100 may include, for example, a communication interface 2102. The communication interface 2102 may enable data and control input and output. The communication interface 2102 may, for example, enable communication over one or more communication networks, similar to communication network(s) 102 of FIG. 1. The communication interface 2102 may be communicatively coupled, directly or indirectly, to the communication network(s) 102. The user device 2100 may include a working memory device 2104, and a processor system/function/module/device (hereinafter the processor 2106). The processor 2106 may use the working memory device 2104 to store data that is about to be operated on, being operated on, or was recently operated on. The processor 2106 may store instructions on the working memory device 2104 and/or on one or more other memory structures or devices, such as, for example, non-transitory computer readable medium system/function/module/device (hereinafter the non-transitory computer readable medium 2108). When executed by the processor 2106, the instructions may cause the processor 2106 to perform, for example, one or more aspects of the methods described herein.

The user device 2100 may be implemented with a bus architecture, represented generally by the bus 2110. The bus 2110 may include any number of interconnecting buses and bridges depending on the specific application of the user device 2100 and overall design constraints. The bus 2110 may communicatively couple various circuits including one or more processors (represented generally by the processor 2106), the working memory device 2104, the communication interface 2102, and the non-transitory computer readable medium 2108. The bus 2110 may also link various other circuits and devices, such as timing sources, peripherals, voltage regulators, and power management circuits and devices, which are well known in the art, and therefore, are not described any further.

The communication interface 2102 provides a means for communicating with other apparatuses over a transmission medium. In some implementations, the communication interface 2102 includes circuitry and/or programming adapted to facilitate the communication of information bi-directionally with respect to one or more communication devices in a network. In some implementations, the communication interface 2102 is adapted to facilitate wireless communication of the user device 2100. In these implementations, the communication interface 2102 may be coupled to one or more antennas 2112 as shown in FIG. 21 for wireless communication within a wireless communication system. In some implementations, the communication interface 2102 may be configured for wire-based communication. For example, the communication interface 2102 could be a bus interface, a send/receive interface, or some other type of signal interface including drivers, buffers, or other circuitry for outputting and/or obtaining signals (e.g., outputting signal from and/or receiving signals into an integrated circuit). The communication interface 2102 can be configured with one or more standalone receivers and/or transmitters, as well as one or more transceivers. In the illustrated example, the communication interface 2102 includes a transmitter 2114 and a receiver 2116. The communication interface 2102 serves as one example of a means for receiving and/or means transmitting.

The processor 2106 may be responsible for managing the bus 2110 and general processing, including the execution of software stored on the non-transitory computer readable medium 2108. The software, when executed by the processor 2106, may cause the processor 2106 to perform the various functions described below for any particular apparatus or module. The non-transitory computer readable medium 2108 and the working memory device 2104 may also be used for storing data that is manipulated by the processor 2106 when executing software.

One or more processors, such as processor 2106 in the user device 2100 may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer readable medium, such as non-transitory computer readable medium 2108. Non-transitory computer readable medium 2108 may include, by way of example, a magnetic storage device (e.g., hard disk, floppy disk, magnetic tape, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable non-transitory medium for storing software, date, and/or instructions that may be accessed and read by a computer or the processor 2106. Computer readable media may also include, by way of example, a carrier wave, a transmission line, and any other suitable medium for transmitting software and/or instructions that may be accessed and read by a computer or the processor 2106.

The processor 2106 is arranged to obtain, process and/or send data, control data access and storage, issue commands, and control other desired operations. The processor 2106 may include circuitry configured to implement desired programming provided by appropriate media in at least one example.

The non-transitory computer readable medium 2108 may be embodied in a computer program product. By way of example, a computer program product may include a computer readable medium in packaging materials. Those skilled in the art will recognize how best to implement the described functionality presented throughout this disclosure depending on the particular application and the overall design constraints imposed on the overall system.

In some aspects of the disclosure, the processor 2106 may include circuitry configured for various functions. For example, the processor 2106 may include a circuit/module for operating 2120 and configured to manage operation of data received from the telematics unit 108 (FIG. 1) and the server 110 (FIG. 1) and to perform input/output operations associated with access to the Internet web and perform, for example, methods described herein. For example, the processor 2106 may include a data storage 2122 system/function/module/device configured to store data including data including but not limited to sensory data, event data, threshold levels, video data, driver data, score data and previously collected data sets. For example, the processor 2106 may include a file system/function/module/device 2124 configured to control how data in local data storage and/or remote data storage is stored and retrieved. For example, the processor 2106 may include a vehicle heads up display (HUD) system/function/module/device 2126 configured for video input and output. For example, the processor 2106 may include a vehicle HUD system/function/module/device 2126 configured to control automotive heads up displays on a vehicle.

In some aspects of the disclosure, the non-transitory computer readable medium 2108 of the user device 2100 may include instructions that may cause the various systems/functions/modules/devices of the processor 2106 to perform the methods described herein. For example, the non-transitory computer readable medium 2108 may include operating instructions or code 2130 to the circuit/module for operating 2120. For example, the non-transitory computer readable medium 2108 may include data storage instructions 2132 corresponding to the data storage system/function/module/device 2122. For example, the non-transitory computer readable medium 2108 may include file system instructions 2134 corresponding to the file system/function/module/device 2124. For example, the non-transitory computer readable medium 2108 may include vehicle HUD instructions 2136 corresponding to the vehicle HUD system/function/module/device 2126. For example, the non-transitory computer readable medium 2108 may include dashboard instructions 2138 corresponding to the vehicle HUD system/function/module/device 2126.

Alternative Device Pairing Method

Figure 22:
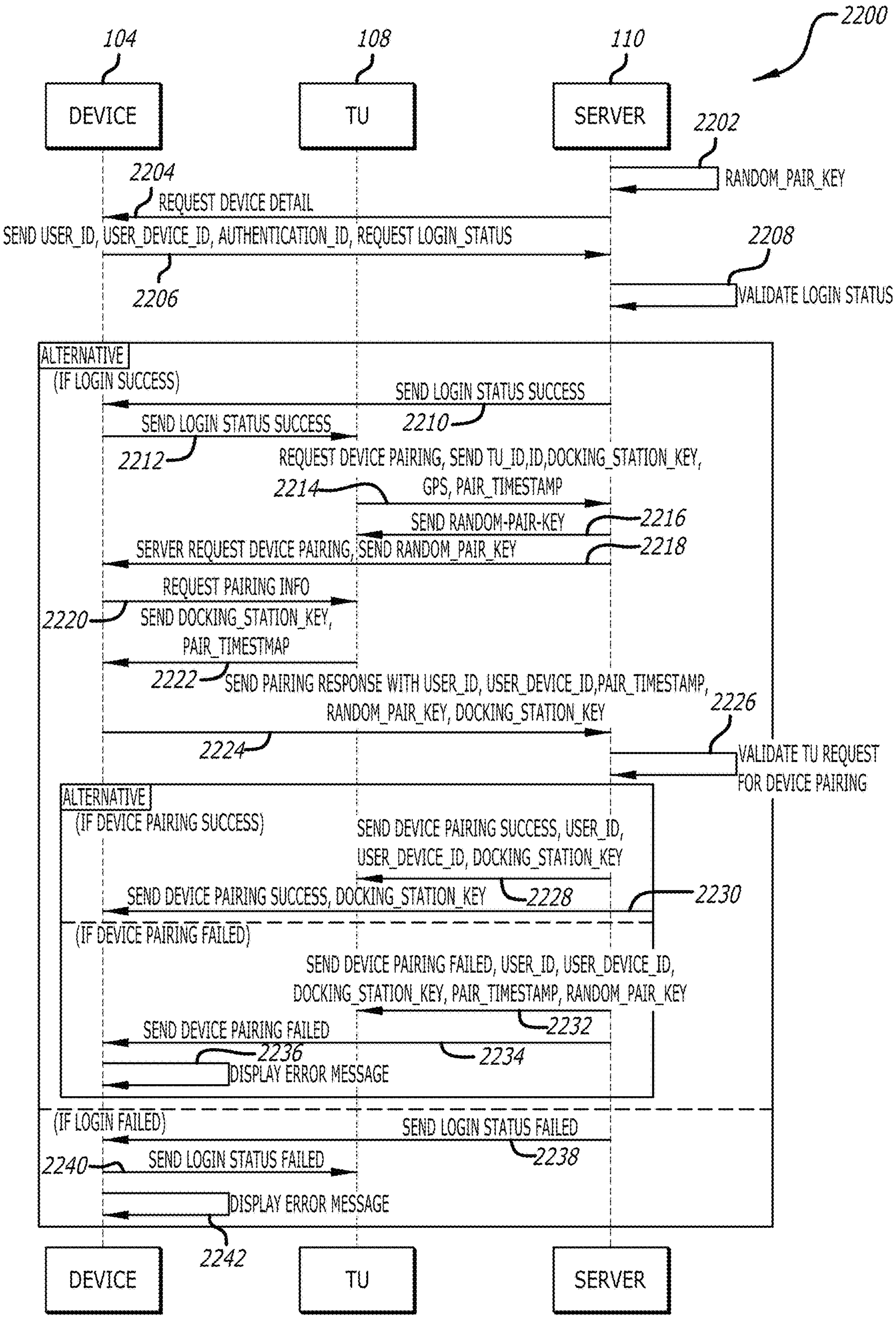
FIG. 22 is a flow diagram illustrating an alternative system pairing sequence.

FIG. 22 is a flow diagram illustrating an alternative system pairing sequence 2200. The system pairing establishes a 3-way system identification between the remote server, the telematics unit (TU) and the user device. The successful completion of system pairing means each device (i.e., the user device, the recognizes the identity of the other devices it is in communication with. System pairing is accomplished by the TU (random pair key) and the remote server (docking station key) generating their own unique random keys for each session request and sharing these keys via different communication paths asynchronously and based on a request/response method.

First, the remote server generates a unique random pair key 2202 and sends a request to a user device for its information/device detail 2204. Next, the user device transmits to the remote server, in response to the request, a user ID, user device ID, authentication ID, a request for login status 2206. The remote server then validates the login status 2208.

If login has been successful, the remote server transmits a login success message to the user device 2210 and the user device then transmits the login success message to the TU 2212. Next, the TU sends a request for device pairing to the remote server along with the TU ID docking station key, GPS (Global Positioning System) location, and pair timestamp 2214. Upon receipt, the remote server sends the random pair key to the TU 2216 and sends a request to pair with the user device along with the random pair key 2218.

Next, the user device sends the request pairing information to the TU 2220 and in return the TU sends the docking station key and the pair timestamp to the user device 2222. The user device then sends the pairing response to the remote server, the response includes the user ID, user device ID, pair timestamp, random pair key, and docking station key 2224. The remote server then validates the TU request for device pairing 2226.

If the pairing request has been successful, the remote server sends a device pairing success message to the TU along with the user ID, user device ID, and docking station key 2228. Additionally, the remote server sends the device pairing success message to the user device along with the docking station key 2230.

However, if device pairing fails, the remote server sends a device pairing failed message to the TU along with the user ID, user device ID, docking station key, pair timestamp, and the random pair key 2232. Additionally, the remote server sends the user device a device pairing failed message 2234 and the user device displays an error message 2236 on its display screen.

If the login fails, the remote server sends a login status failed message to the user device 2238. The user device then sends a login status failed message to the TU and the user device displays an error message 2240 on its display screen.

Figure 23:
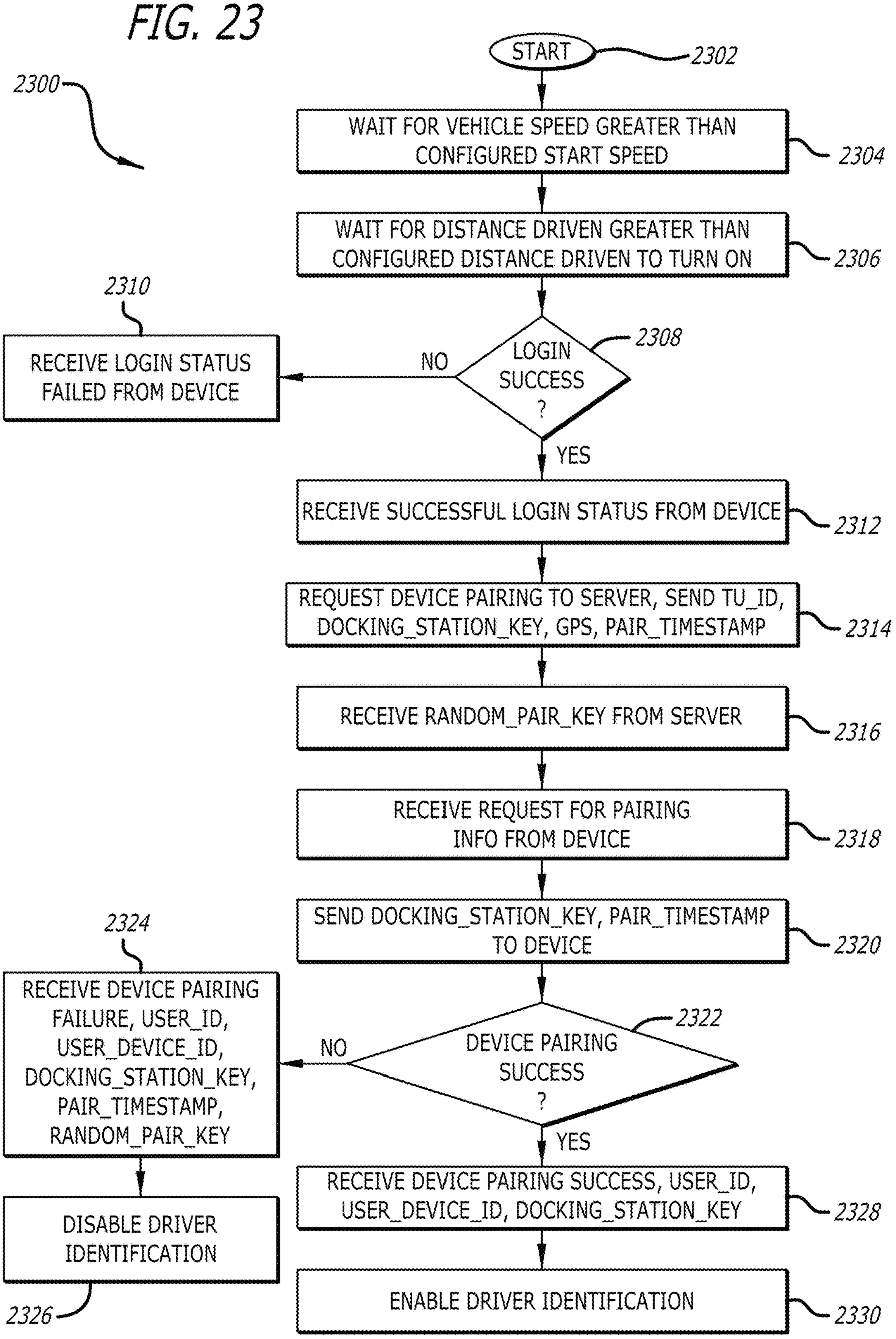
FIG. 23 is a flow diagram illustrating an alternative system pairing telematics unit (TU) flow.

FIG. 23 is a flow diagram illustrating an alternative system pairing telematics unit (TU) flow 2300. Once the TU is woken up for communication by the user device, the TU initiates the process of a system pairing sequence 2302. The TU waits for the user device to attain a preconfigured (or predefined) start speed 2304 to ensure a trip or driving session has started. A user can place their user device on the docking station long before a trip or driving session begins and may remove the user device multiple times before the vehicle starts moving. This approach minimizes unnecessary cloud communication, cloud connectivity data cost and session management workload on the remote server.

Once the vehicle reaches the predefined speed, the TU further waits for the vehicle to travel a predefined distance to ensure that an actual trip has started 2306. The predefined speed and the predefined distance may be set by the administrator/employer or manager. In one example, the predefined speed may be 20 mph and the predefined distance is one (1) mile.

Next, if it is determined if the login has been unsuccessful 2308, a login status failed message is received from the user device 2310. If it is determined that the login has been successful 2308, a login status success message is received from the user device 2312.

Next, the TU sends a device pairing request to the remote server along with the TU ID, docking station key, GPS location, and the pair timestamp 2314. The TU then receives the random pair key from the remote server 2316.

Next, a request for the pairing information is received from the user device 2318 and the TU sends the docking station key and pair timestamp to the user device 2320.

Next, the TU determines if device pairing has been successful 2322. If unsuccessful, the TU receives a device pairing failure message from the remote server along with the user ID, user device ID, docking station key, pair timestamp, and random pair key 2324. The TU then disables driver identification 2326.

If device pairing has been successful 2322, the TU receives a device pairing success message from the remote server along with the user ID, user device ID, and docking station key 2328. The TU then enables driver identification 2330.

Figure 24:
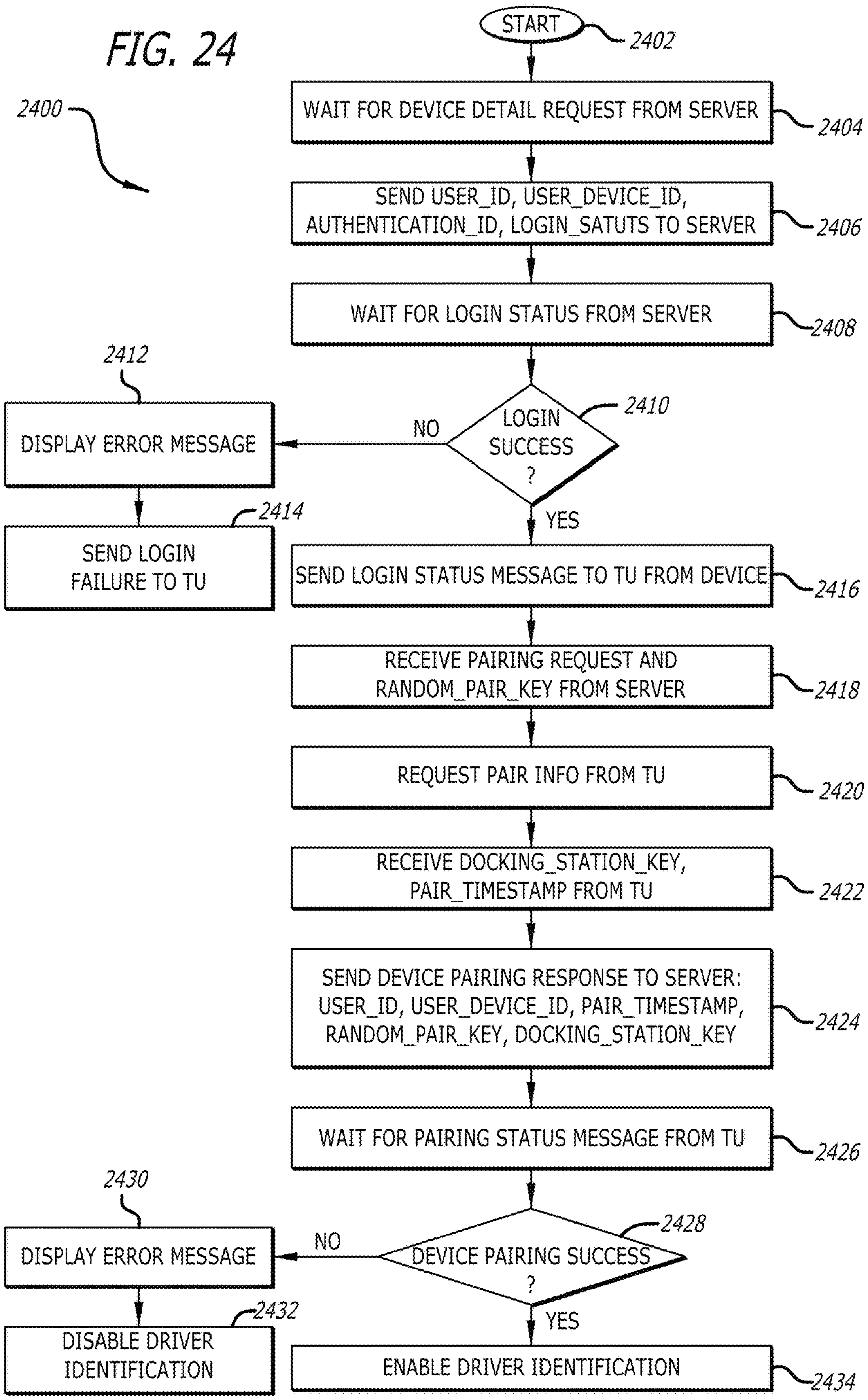
FIG. 24 is a flow diagram illustrating an alternative system pairing user device flow.

FIG. 24 is a flow diagram illustrating an alternative system pairing user device flow 2400. First, the user device logs onto the remote server 2402. Once the user device has successfully logged onto the remote server, it waits for a device detail request from the remote server 2404. Upon receiving the request, the user device sends a user ID, user device ID, authentication ID, and login status to the remote server 2406. The user device then waits for the login status from the remote server 2408 to determine if the login was successful 2410. If login has been unsuccessful, the user device displays an error message on its display screen 2412 and sends a login failure status message to the TU 2414.

If login has been successful, the user device sends the login success message to the TU 2416 and receives a pairing request and random pair key from the remote server 2418. Next, the user device request pairing information from the TU 2420. In response to the request, the TU sends the user device the docking station key and the pair timestamp 2422.

Next, the user device sends the pairing response from the TU to the remote server along with the user ID, user device ID, timestamp, random pair key, and docking station key 2424. The user device then waits to receive the pairing status message from the TU 2426 to determine if the device pairing was successful 2428. If pairing was unsuccessful, the user device displays an error message on its display screen 2430 and disables driver identification 2432. If pairing was successful, the user device enables driver identification 2434.

Figure 25A:
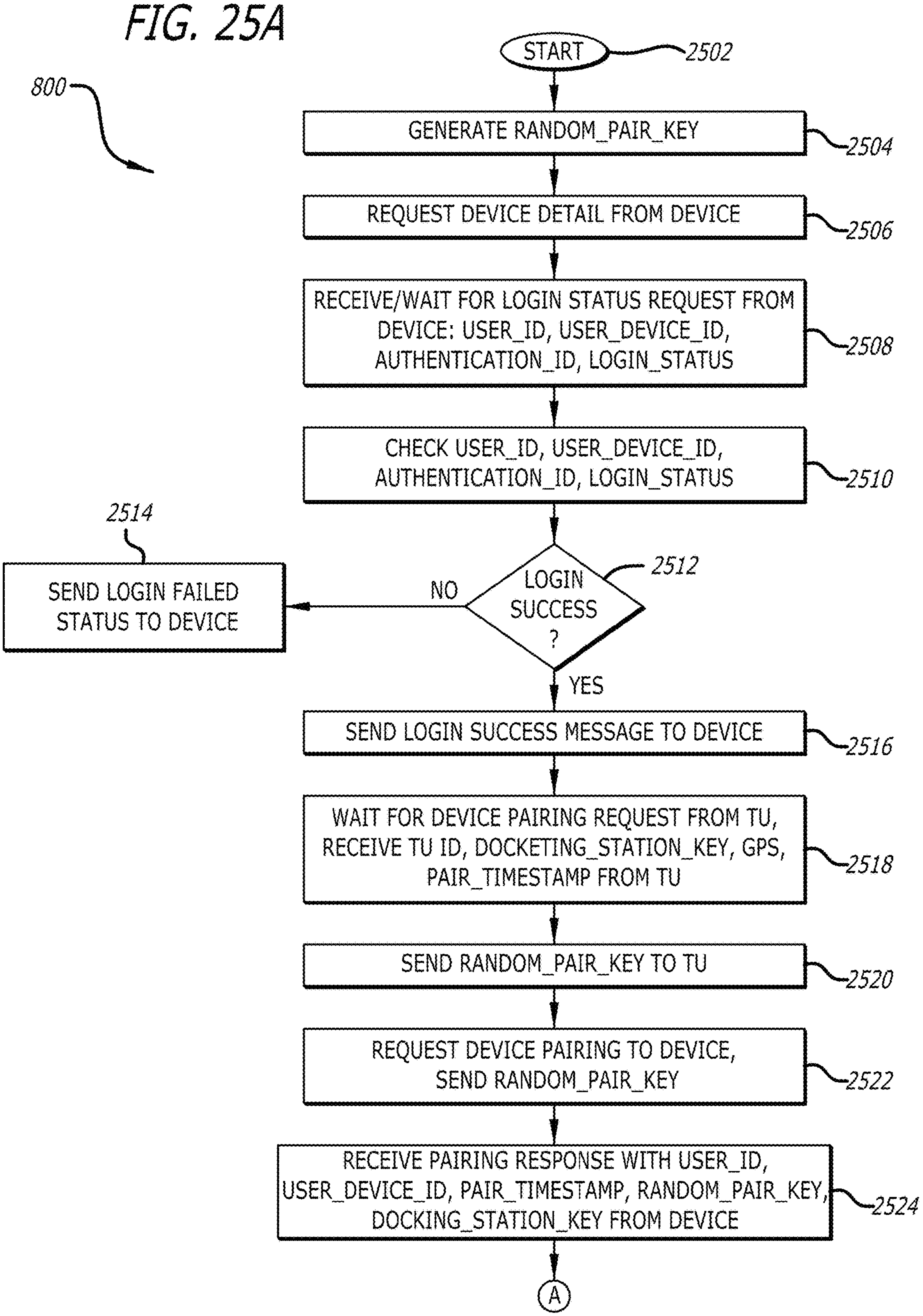
FIGS. 25A and 25B are a flow diagram illustrating an alternative system pairing remote server flow.
Figure 25B:
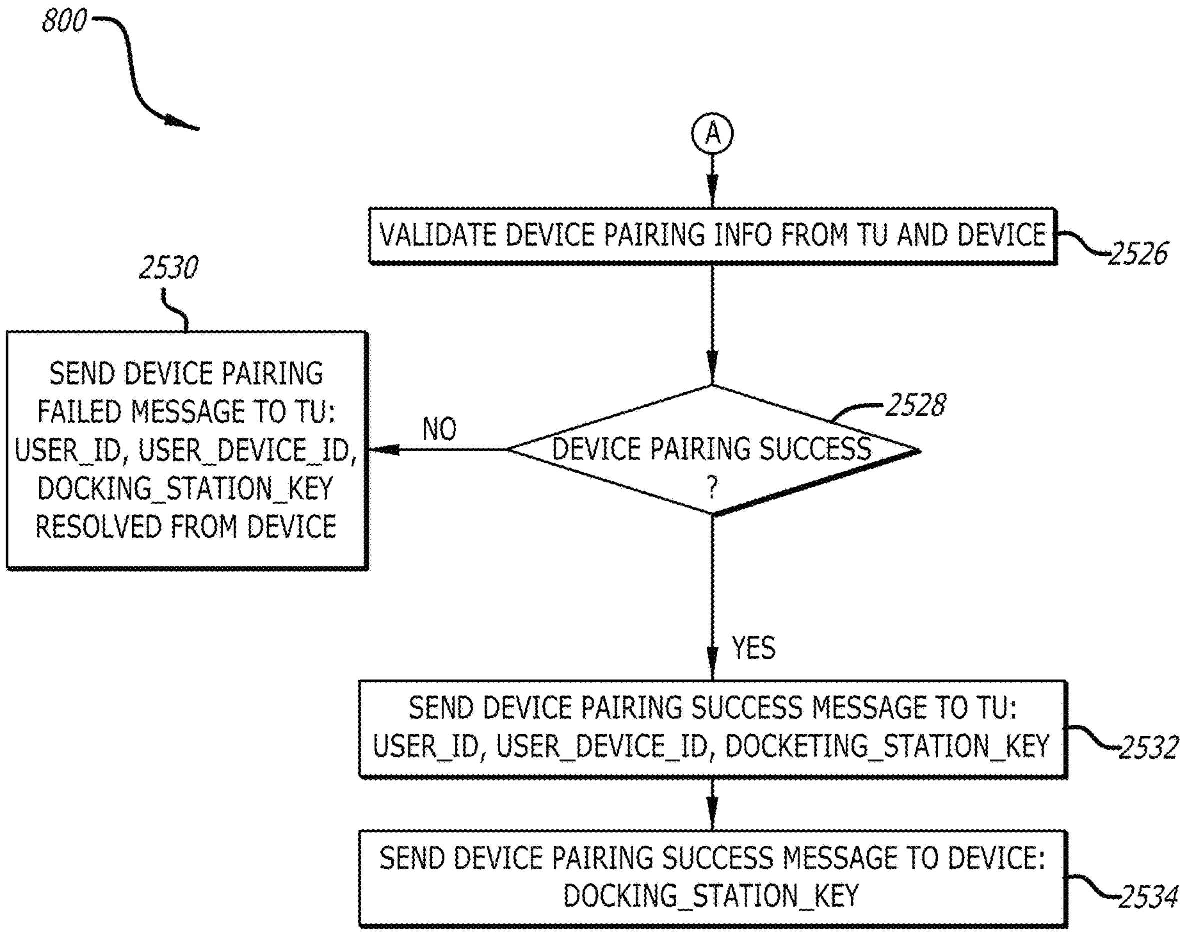

FIG. 25 is a flow diagram illustrating an alternative system pairing remote server flow 2500. The remote server acts as the control unit that not only authenticates the TU and the user device separately, but also validates if the TU and user device are allowed to communicate with each other 2502. The remote server does this by receiving common validation data from the TU and the user device synchronously using request/response, and then comparing the data to make sure it is valid and the same.

First, the remote server generates a random pair key 2504 and request user device detail from the user device 2506. Next, the remote server receives/waits for a login status request from the user device which includes the user ID, user device ID, authentication ID, and login status 2508. Once the status request is received from the user device, the remote server checks the user ID, user device ID, authentication ID, and login status 2510 to determine if login has been successful 2512. If login was not successful, the remote server sends a login failed status message to the user device 2514. If login was successful, the remote server sends a login success message to the user device 2516.

Next, the remote server waits for a pairing request from the TU along with the TU ID, docking station key, GPS location, and pair timestamp 2518. Once the pairing request is received, the remote server sends the random pair key to the TU 2520 and requests device pairing with the user device and sends the random pair key to the user device 2522. Upon receiving the pairing response along with the user ID, user device ID, pair timestamp, random pair key, and docking key from the user device 2524, the remote server validates the device pairing information from the TU and the user device 2526.

Next, a determination is made as to whether device pairing was successful 2528. If device pairing was unsuccessful, the remote server sends a device pairing failed message to the TU along with the user ID, user device ID, docketing station key resolved from device 2530. If device pairing was successful, the remote server sends a device pairing success message to the TU along with the user ID, user device ID, and docking station key 2532. The remote server then sends the device pairing success message to the user device along with the docking station key 2534.

CONCLUSION

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. The terms "at least one" and "one or more" may be used interchangeably herein.

Within the present disclosure, the terms "memory", "computer readable medium" and "storage" may be used interchangeably.

Within the present disclosure, use of the construct "A and/or B" may mean "A or B or A and B" and may alternatively be expressed as "A, B, or a combination thereof" or "A, B, or both". Within the present disclosure, use of the construct "A, B, and/or C" may mean "A or B or C, or any combination thereof" and may alternatively be expressed as "A, B, C, or any combination thereof".

One or more of the components, steps, features and/or functions illustrated herein may be rearranged and/or combined into a single component, step, feature, or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of:" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method for establishing a 3-way system identification between a server, a telematics unit (TU), and a user device, comprising:

- generating, by at least one processor of the telematic unit, a random pair key;
- requesting, by the at least one processor of the telematic unit, user device information from the user device;
- transmitting, by at least one processor of the user device, user device information to the telematic unit via short range communication;
- transmitting, by the at least one processor of the telematic unit, the user device information to the server;
- retrieving, by at least one processor of the server, a login status associated with the user device from a database on the server;
- requesting, by the at least one processor of the telematic unit, a pairing request from the server upon successful login by the user device;

requesting, by the at least one processor of the server, a device pairing with the user device causing the user device to request pairing information from the telematic unit;

transmitting, by the at least one processor of the telematic unit, the pairing information to the user device, the pairing information includes a copy of the random pair key;

transmitting, by the at least one processor of the user device, the pairing information to the server for validating the device pairing with the user device from telematic unit, the pairing information includes the copy of the random pair key; and transmitting, by the at least one processor of the server, device pair success to the telematic unit; and transmitting, by the at least one processor of the telematic unit, the device pair success to the user device.

2. The method of claim 1, wherein the copy of the random pair key is transmitted to the user device via short range communication.

3. The method of claim 1, wherein the copy of the random pair key is transmitted to the server via a cloud communication.

4. The method of claim 3, wherein the user device information is requested from the user device via short range communication.

5. The method of claim 1, wherein the pairing request includes a user identification, a user device identification, a telematic unit identification, the copy of the random pair key, a user device location, and a timestamp.

6. The method of claim 5, further comprising:

comparing, by the server, the copy of the random pair key received from the user device to the random pair key sent by the telematic unit.

7. The method of claim 6, wherein the random pair key and the copy of the random pair key are transmitted to the server asynchronously.

8. The method of claim 1, wherein the pairing information includes a user identification, a user device identification, a pair timestamp, the copy of the random pair key, and a docking station key.

9. The method of claim 1, further comprising:

waiting, by the at least one processor of the telematic unit, for a vehicle to reach a predefined speed before generating the random pair key.

10. The method of claim 9, further comprising:

waiting, by the at least one processor of the telematic unit, for the vehicle to travel a predefined distance after reaching the predefined speed before generating the random pair key.

11. The method of claim 1, wherein the user device information transmitted to the telematic unit via short range communication includes a user identification, a user device identification, an authentication identification, and a login status.

12. The method of claim 1, further comprising:

transmitting, by the at least one processor of the server, the login status associated with the user device to the telematic unit; and transmitting, by the at least one processor of the telematic unit, the login status to the user device via short range communication.

13. The method of claim 1, wherein the user device is secured to a docking station connected to the telematic unit, and the short range communication between the user device and the telematic unit is via Near Field Communication (NFC).

14. The method of claim 1, wherein the random pair key is uniquely generated for each driving session.

15. The method of claim 1, wherein the random pair key is transmitted from the telematic unit to the user device via a first communication path comprising short range communication, and the random pair key is transmitted from the telematic unit to the server via a second communication path comprising cloud communication, the first communication path and the second communication path being independent of each other.

16. The method of claim 1, further comprising:

storing, by the at least one processor of the server, the pairing request received from the telematic unit in a database on the server prior to requesting the device pairing with the user device.

17. The method of claim 6, wherein validating the device pairing further comprises:

comparing, by the at least one processor of the server, each parameter of the pairing information received from the user device to corresponding parameters of the pairing request received from the telematic unit stored in the database; and verifying, by the at least one processor of the server, that a docking station key received from the user device belongs to the telematic unit requesting the device pairing.

18. The method of claim 1, further comprising:

upon unsuccessful validation of the device pairing, transmitting, by the at least one processor of the server, a device pairing failure status to the telematic unit; and transmitting, by the at least one processor of the telematic unit, a system pairing failure message to the user device via short range communication.

19. The method of claim 1, wherein a telematic unit identification is included in the pairing request transmitted from the telematic unit to the server but is not shared with the user device.

* * * * *